United States Patent [19]
Beck

[11] Patent Number: 5,603,392
[45] Date of Patent: Feb. 18, 1997

[54] HYDRAULIC, ADJUSTABLE SHOCK ABSORBER, IN PARTICULAR FOR MOTOR VEHICLES

[75] Inventor: Hubert Beck, Eitorf-Keuenhof, Germany

[73] Assignee: Fichtel & Sachs AG, Eitorf, Germany

[21] Appl. No.: 277,156

[22] Filed: Jul. 19, 1994

[30] Foreign Application Priority Data

Jul. 20, 1993 [DE] Germany .......................... 43 24 284.7
Oct. 29, 1993 [DE] Germany .......................... 43 37 018.7

[51] Int. Cl.$^6$ .............................. B60G 17/08; F16F 9/46
[52] U.S. Cl. ..................................... 188/299; 188/322.13
[58] Field of Search ........................... 188/299, 311–319, 188/322.13; 280/707, 714; 251/129.08, 129.09, 129.15, 129.2

[56] References Cited

U.S. PATENT DOCUMENTS

| | | | |
|---|---|---|---|
| 5,195,619 | 3/1993 | Doursou et al. | 188/299 |
| 5,301,776 | 4/1994 | Beck | 188/299 |
| 5,335,757 | 8/1994 | Knecht et al. | 188/299 |
| 5,398,789 | 3/1995 | Haudke | 188/299 |
| 5,435,421 | 7/1995 | Beck | 188/299 |
| 5,449,055 | 9/1995 | Geiling et al. | 188/299 |

FOREIGN PATENT DOCUMENTS 3535287  4/1987  Germany .
4137330  11/1992  Germany .

*Primary Examiner*—Robert J. Oberleitner
*Assistant Examiner*—Chris Schwartz
*Attorney, Agent, or Firm*—Nils H. Ljungman and Associates

[57] ABSTRACT

Hydraulic, adjustable shock absorber, in particular for motor vehicles, with a work cylinder, a piston fastened to a piston rod and dividing the work cylinder into two work chambers, at least one additional surrounding tube coaxial to the work cylinder, and at least one adjustable damping valve located in a stationary and sealed manner on the side of the shock absorber. For installation of the damping valve on the outer tube of the shock absorber, the damping valve is centered and held in a sealed manner by a centering ring. The centering ring is welded to the outer tube, and has a threaded location hole to receive the threaded coupling of the damping valve.

10 Claims, 18 Drawing Sheets

HYDRAULIC, ADJUSTABLE SHOCK ABSORBER, IN PARTICULAR FOR MOTOR VEHICLES

BACKGROUND OF THE INVENTION

1. Field of the Invention

This invention relates to a hydraulic, adjustable shock absorber, in particular for motor vehicles, such a shock absorber having a work cylinder, a piston fastened to a piston rod and dividing the work cylinder into two work chambers, at least one additional surrounding tube coaxial to the work cylinder and at least one adjustable damping valve located in a stationary and sealed manner on the side of the shock absorber, whereby a centering ring fixes the damping valve.

2. Background Information

Known are hydraulic, adjustable shock absorbers, such as disclosed in Federal Republic of Germany Patent No. 41 37 330, in which a work piston fastened to a piston rod divides the work cylinder into two work chambers, and in which there is at least one adjustable control valve located on the side of the shock absorber. To form a bypass and for the inflow of the controllable damping valve, there is an additional tube outside the work cylinder but inside the jacket tube which forms the equalization chamber. The valve cartridge runs through a form-fitted centering ring and is connected to the additional tube by means of a threaded coupling. The centering ring is sealed against the atmosphere both by means of its shape, which shape corresponds to the shape of the outer tube, and by an additional gasket.

One disadvantage of this known design is that the threaded coupling between the valve cartridge and the additional tube can exert a torque bias on the work cylinder, so that there can be problems regarding the free movement of the work piston. Such a threaded coupling between the valve cartridge and the additional tube is essentially only possible if the oil conductor is supported in the vicinity of the piston rod guide or of the valve base. Such a support has the additional disadvantage that an excessively long oil conductor reduces the size of the equalization chamber, in which case either this equalization chamber has to be enlarged or, if the equalization chamber is too small, a foaming of the damping medium can occur.

Also known are shock absorber systems for vehicles, such as that disclosed in Federal Republic of Germany Patent No. 35 35 287, FIG. 2, in which a prefabricated thick-walled pipe base is welded to he outer tube of the shock absorber. One advantage of this configuration is that the valve cartridge is isolated from the oil conductor, which means that the valve cartridge and the oil guide tube can move relative to one another, which means that there is essentially no reason to fear a torque bias on the work cylinder. But this design has the disadvantage that the pipe base typically must be manufactured as a complex lathe-turned and/or milled part. The subsequent welding of the pipe base to the jacket tube requires refinishing work, since the parts which fit together and their fastening threads are located in the immediate vicinity of the weld seam.

OBJECT OF THE INVENTION

The object of the invention, with the use of the standard components of a conventional shock absorber and a minimum of manufacturing effort and expense, is to connect a controllable damping valve to the shock absorber laterally by means of simple, economical components.

SUMMARY OF THE INVENTION

The invention teaches that this object can be achieved if the centering ring has a location hole which is surrounded at some radial distance by a wall, and that the end of the wall facing the work cylinder is provided with a flange which corresponds to the external contour of the jacket tube.

One advantage of this configuration is that conventional shook absorbers manufactured from steel tubes can easily be equipped with a controllable damping valve. It is also possible, for example, to take a complete outer tube manufactured for a conventional application (outer tube with accessories, spring plate, brackets, possibly even clips, etc.) from the series manufacturing process end to machine the outer tube further for the fastening of a controllable damping valve located on the side. It is also advantageous that as a result of the fixing, by means of the threaded coupling located in the centering ring and of the installation of a corresponding gasket, an excellent seal can be achieved, whereby the valve cartridge can telescope in relation to the oil conductor. In other words, the valve cartridge and the oil conductor can be moved relative to one another, so that this design essentially requires neither a torque bias on the work cylinder nor an excessively long oil conductor.

Another feature contemplated by at least one embodiment of the present invention is that the flange is welded to the jacket tube. One advantage of this configuration is that, on account of the use of the circular flange on the outer tube, the centering ring can be stamped on its flange, thereby eliminating the need for a complex, expensive and time-consuming concave routing of the outside diameter of the tube, and, on the other hand, the flange can essentially act as a cover, so that during the welding process, essentially no burnout and no weld spatter can get inside he shock absorber. As a result of the presence of this flange and thus the corresponding distance to the neighboring components, the flange has a large heat radiating surface area, so that the heat of welding has been dissipated to the ambient temperature before reaching the threaded portion which must be protected against distortion.

In one variant which is relatively easy to manufacture, the centering ring can preferably be designed as a deep drawn part. The flange can thereby be manufactured advantageously by stamping, possibly even punching.

Another feature claimed by the invention is that the space between the location hole and the wall is designed as a passage. As a result of the cup-shaped design of the centering ring, the space can easily be used for the inflow or outflow of the damping medium.

Another feature claimed by the invention is that the location hole, adjacent to the threaed portion, expands radially outward into an expanded portion. It is advantageous if the expanded portion and the damping valve thereby form the boundaries of a flow passage.

To return the oil which has leaked from the damping valve, the invention also claims that the expanded portion is provided with holes which connect the space to the flow passage.

In one advantageous embodiment, the expanded portion is provided with a seal. The expanded portion can thereby be used as a chamber for the seal, so that a corresponding low height can be maintained.

In one configuration, the invention teaches that the location hole is slotted.

In one particularly advantageous embodiment, the terminal area of the location hole, together with the valve cartridge, can preferably form a positive connection, possibly even a form-fit connection or a keyed joint. The connection can advantageously be made by means of plug-and-socket connectors and/or snap connectors. The invention also teaches that for the positive connection, the location hole can advantageously be provided with at least one area which projects toward the valve cartridge, and which interacts with a contact surface in the vicinity of the valve cartridge.

In an additional configuration of the invention, the contact surface is located so that it runs at least partly along the circumference, or the contact surface can be a projecting surface and/or a groove running at least partly along the circumference of the valve cartridge.

In one favorable embodiment, the valve cartridge is flexibly supported in relation to the centering ring, whereby there is advantageously an elastomer element and/or a spring and/or a spring lock washer which acts as a flexible support.

The invention also teaches that the slot or slots in the centering ring form a connection between the space and the holes.

In summary, one aspect of the invention resides broadly in a shock absorber comprising a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the chamber into first and second chambers; an outer tube disposed about the chamber, the piston and the piston rod; means for permitting fluid communication between the first and second chambers; the means for permitting fluid communication comprising damping valve means mounted at the outer tube; the damping valve means comprising: a valve arrangement, the valve arrangement having means for adjusting fluid communication between the first and second chambers; means for mounting the valve arrangement with respect to the outer tube; the mounting means comprising: a first wall portion for fixedly holding at least a portion of the valve arrangement with respect to the outer tube; a second wall portion being connected with the outer tube; and means for connecting the first wall portion and the second wall portion with one another, to fixedly retain the first wall portion with respect to the second wall portion; the first wall portion and the second wall portion being spaced apart from one another; and the connecting means being positioned to provide at least one uninterrupted space between the first wall portion and the second wall portion.

Another aspect of the invention resides broadly in a method of assembling a shock absorber, the method comprising the steps of: providing a cylinder defining a chamber therein, the cylinder for containing a damping fluid; providing a piston rod, the piston rod for sealingly projecting into the cylinder and for being axially displaceable with respect to the cylinder; providing a piston for being attached to the piston rod, the piston for being slidably disposed within the cylinder to sealingly divide the chamber into first and second chambers; providing means for permitting fluid communication between the first and second chambers; providing an outer tube for being disposed about the chamber the piston and the piston rod; the step of providing means for permitting fluid communication comprising the step of providing damping valve means for being mounted at the outer tube; the step of providing the damping valve means comprising the steps of: providing a valve arrangement, the valve arrangement having means or adjusting fluid communication between the first and second chambers; providing means for mounting the valve arrangement with respect to the outer tube; the step of providing the mounting means comprising the steps of: providing a first wall portion for fixedly holding at least a portion of the valve arrangement with respect to the outer tube; providing a second wall portion for being connected with the outer tube; and providing means for connecting the first wall portion and the second wall portion with one another, to fixedly retain the first wall portion with respect to the second wall portion; the method further comprising the additional steps of: spacing the first wall portion and the second wall portion being apart from one another; positioning the connecting means to provide at least one uninterrupted space between the first wall portion and the second wall portion; attaching the piston to the piston rod; slidably disposing the piston within the cylinder to sealingly divide to chamber into the first end second chambers disposing the outer tube about the chamber, the piston and the piston rod; mounting the valve arrangement at the outer tube by: connecting the second wall portion with the outer tube; and fixedly holding the at least a portion of the valve arrangement with respect to the outer tube with the first wall portion; and disposing the damping fluid in the chamber in the sealed cylinder.

BRIEF DESCRIPTION OF THE DRAWINGS

Preferred embodiments of the invention are schematically illustrated in the accompanying drawings.

FIGS. 11–25 illustrate components which may be utilized in accordance with the embodiments of the present invention, wherein:

FIGS. 11, 12, 13, and 14 show a solenoid valve in cross section in the vicinity of the vibration damper;

FIGS. 15 to 19 show various views of the nonreturn body and of the coil;

FIGS. 20 and 21 illustrate an additional embodiment of a solenoid valve, which is located in the vicinity of the bottom of a vibration dampers;

FIG. 22 illustrates the solenoid valve assembly in phantom;

FIG. 23 shows a solenoid valve in cross section attached to a vibration damper or shock absorber;

FIG. 24 shows an exploded view of the individual parts of a controllable damping valve located on the side of a vibration damper; and FIG. 25 shows a cross section of a solenoid valve with the internal parts within the valve casing visible.

DESCRIPTION OF THE PREFERRED EMBODIMENTS

Figure 1:
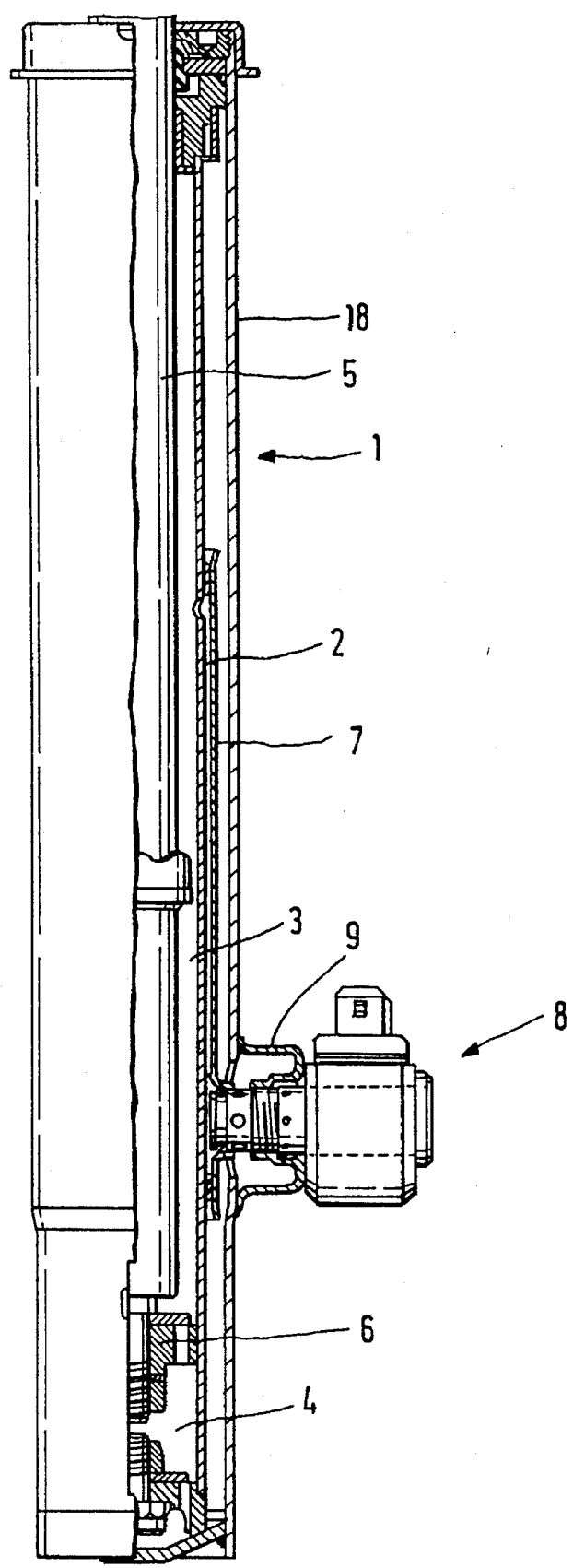
FIG. 1 shows, in partial cross section, a shock absorber with a damping valve located laterally.

The shock absorber 1 illustrated in FIG. 1 preferably essentially includes the work cylinder 2, a piston 6 fastened to a piston rod 5 and dividing the work cylinder into two work chambers 3 and 4, whereby the work cylinder 2 is surrounded by an additional tube which is connected as a bypass both to the work chamber 3 and to the damping valve 8. Between the outer jacket tube 18 and the work cylinder 2, there is preferably a ring-shaped cavity which functions as an equalization chamber. The damping medium which travels through the bypass from the work cylinder 3 to the damping valve 8 is then preferably conducted into the equalization chamber. The damping valve 8 in this embodiment is preferably connected to the jacket tube 18 by means of a centering ring 9.

Figure 2:
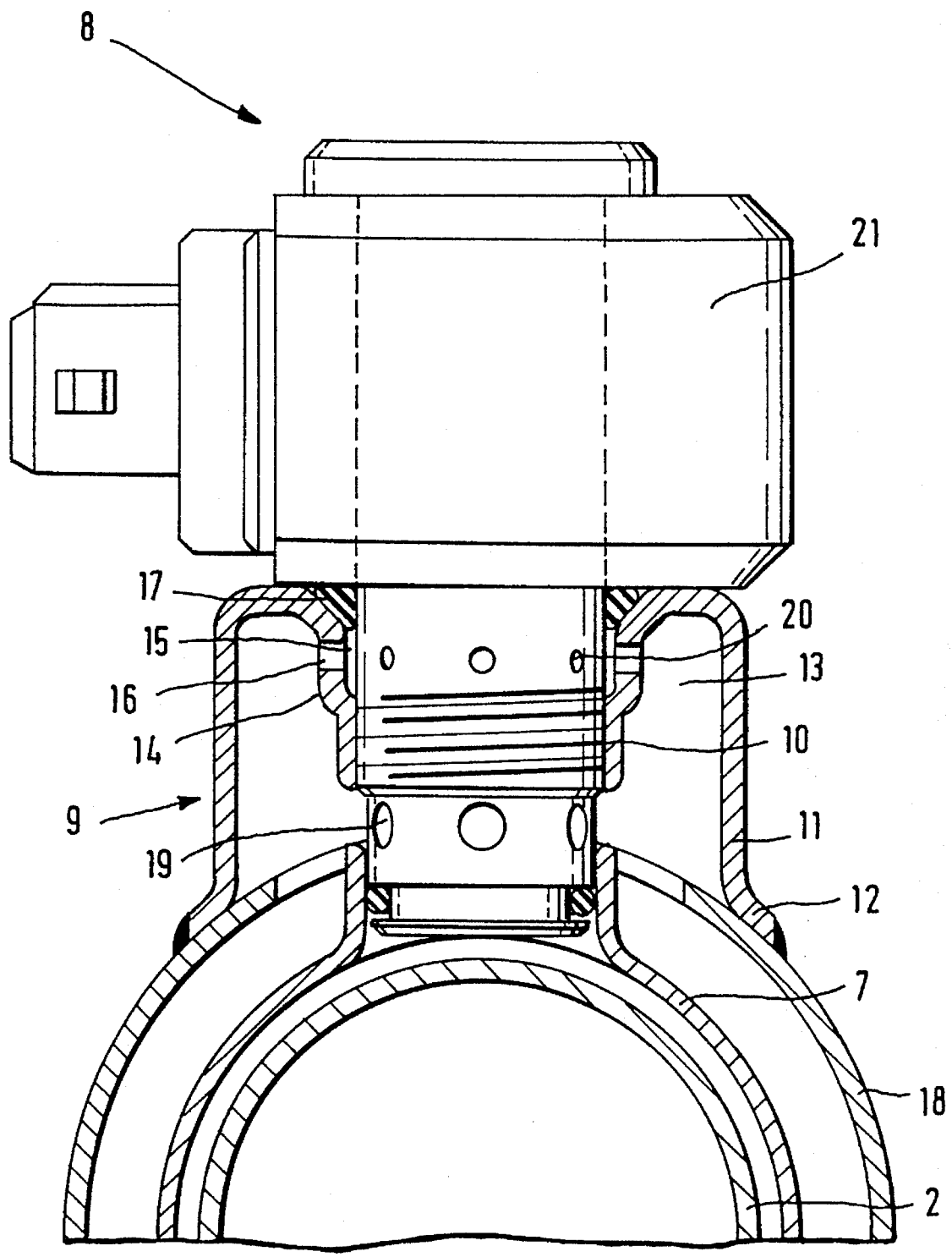
FIG. 2 shows a cross Section through the shock absorber illustrated in FIG. 1, in the vicinity of the damping valve.

FIG. 2 shows a damping valve 8 on an enlarged scale, whereby the centering ring 9 is preferably welded by means of the flange 12 to the jacket tube and the damping cartridge of the damping valve 8 is preferably held axially in a connection of the tube 7. The seal is preferably provided in the form of a gasket. The centering ring 9 is preferably provided with a first wall portion defining the perimeter of location hole 10 and a corresponding thread for the threaded coupling of the damping cartridge, whereby a space 13 is preferably formed between a second wall portion, or the wall 11 and the location hole 10. The damping medium preferably arrives in this space 13 from the holes 19 via the space 13 in the equalization chamber which is preferably formed between the work cylinder 2 and the jacket tube 18.

As a result of the expanded portion 14 of the centering ring 9, as shown, the holes 16 need not necessarily overlap with the holes 20 of the valve cartridge, in order to return the oil which has leaked from the damping valve S also into the space 13. The flow passage 15, by means of the holes 16, essentially guarantees a corresponding flow of the damping medium. To seal the flow passage 15 against the atmosphere, a seal 17 is preferably located between the end surface of the centering ring 9 and the coil 21 of the damping valve 8.

Thus, in accordance with a preferred embodiment of the present invention, centering ring 9 may preferably include an expanded portion 15, wherein such an expanded portion 15 would essentially be embodied by a portion of increased diameter with respect to the threaded location hole 10.

Figure 3:
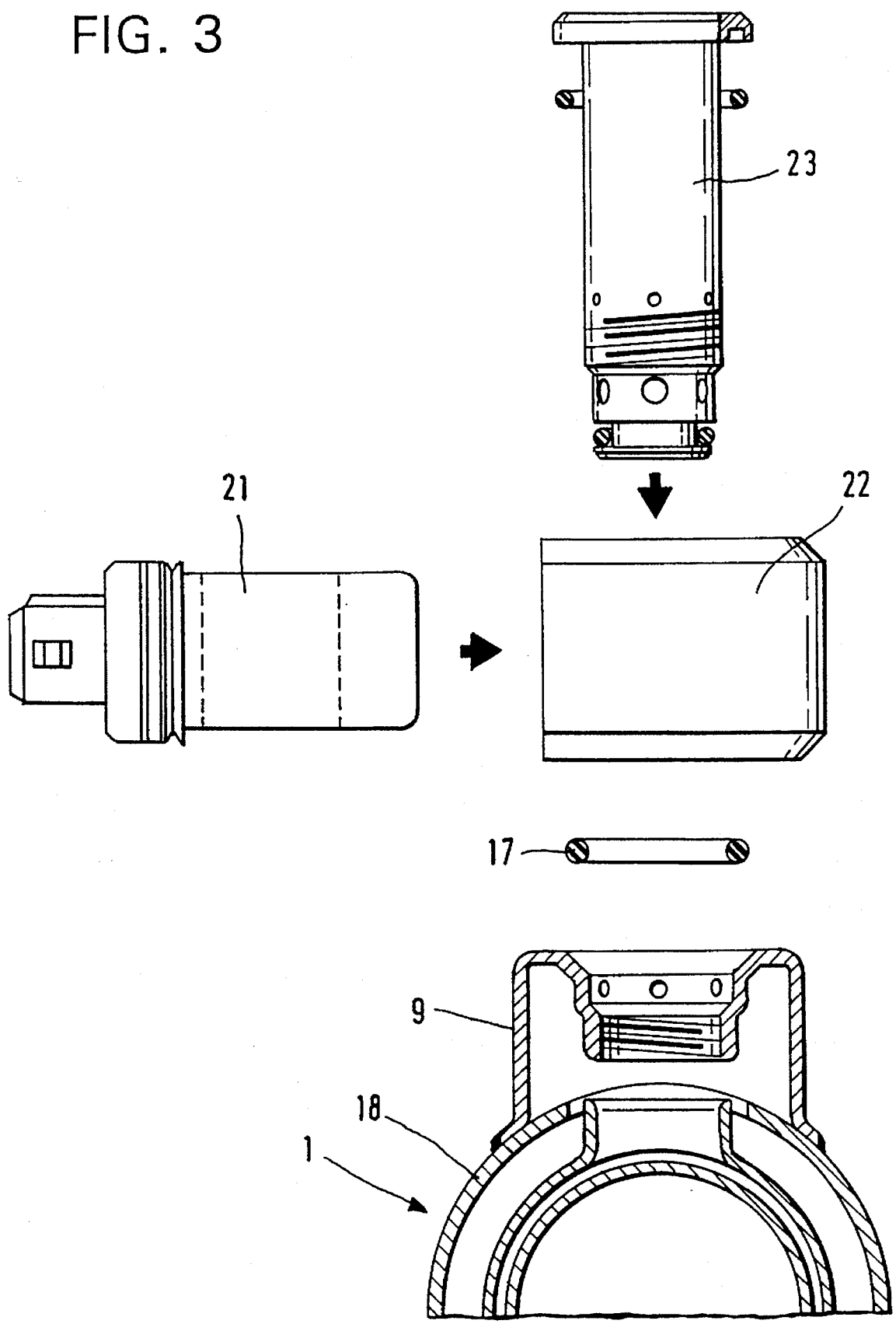
FIG. 3 shows the assembly of the individual parts of the damping valve.

FIG. 3 shows an installation in which the shock absorber 1 on its external jacket tube 18 is preferably connected to the centering ring 9, whereby after the insertion of the seal 17, the magnetic return body 22 and the coil 21, the valve cartridge 23 are preferably fastened together as a unit by means of the threaded coupling.

Figure 4:
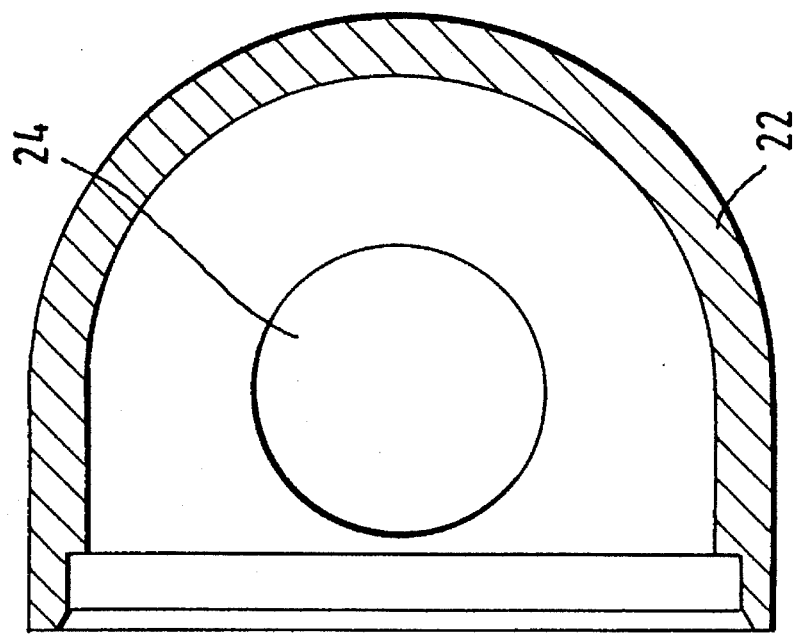
FIG. 4 shows a detail of the magnet coil/solenoid and the magnetic return body illustrated in FIG. 3.
Figure 4:
Figure 4:
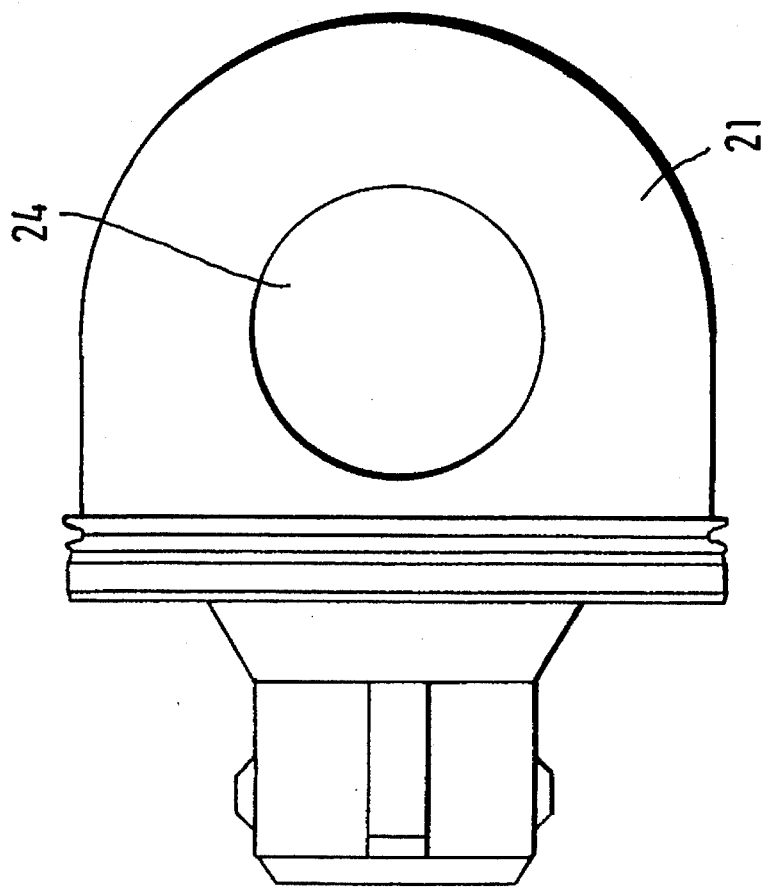

FIG. 4 shows a detail of the coil 21 and of the magnetic return body 22, whereby after the insertion of the coil 21 into the magnetic return body 22. The holes 24 preferably overlap so that the valve cartridge 23 can then be inserted.

Figure 5:
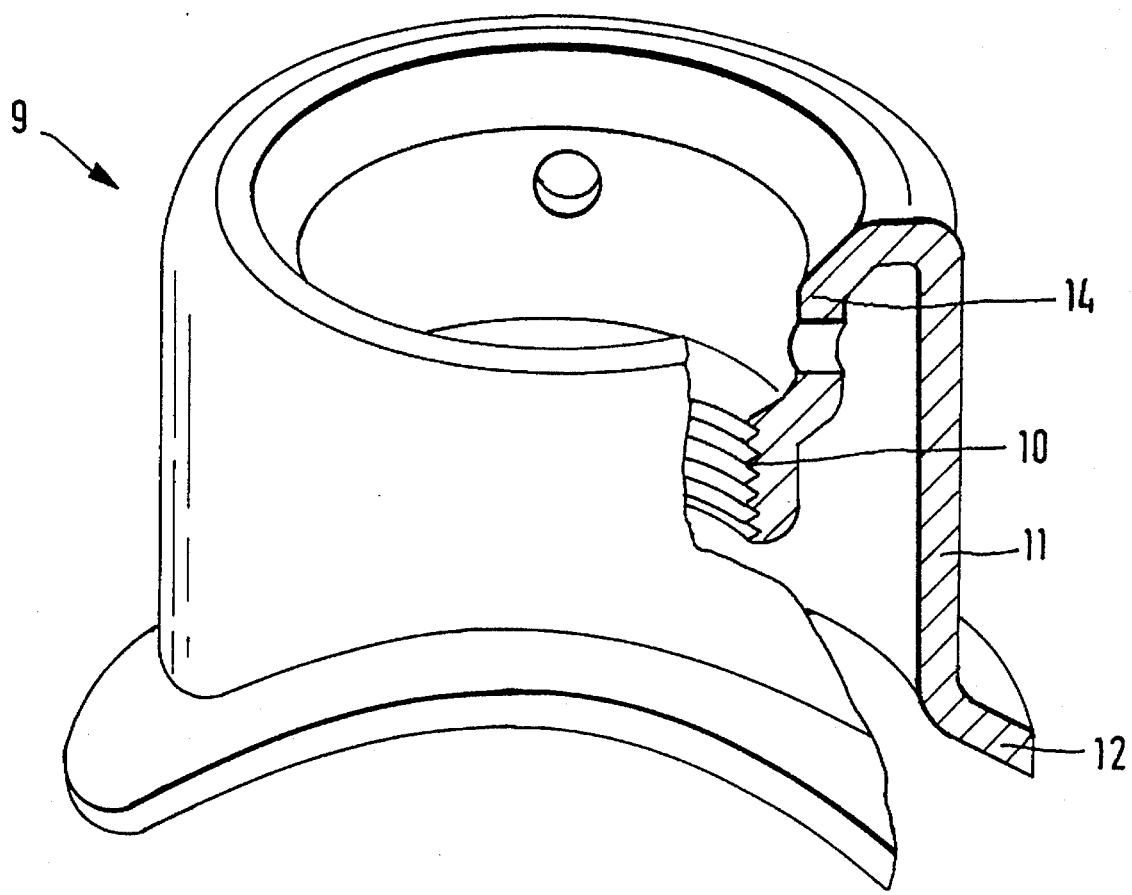
FIG. 5 shows a centering ring in detail, in a perspective view in partial cross section.

FIG. 5 shows a detail of a centering ring 9, whereby adjacent to the wall 11 there is preferably a flange 12 which corresponds to the external contour of the jacket tube, and in the vicinity of the location hole 10 there is preferably a thread for the valve cartridge, whereby the expanded portion 14 is preferably designed to form the flow passage 15, preferably for the placement of the holes 16 and or the fastening of the gasket 17.

Figure 6:
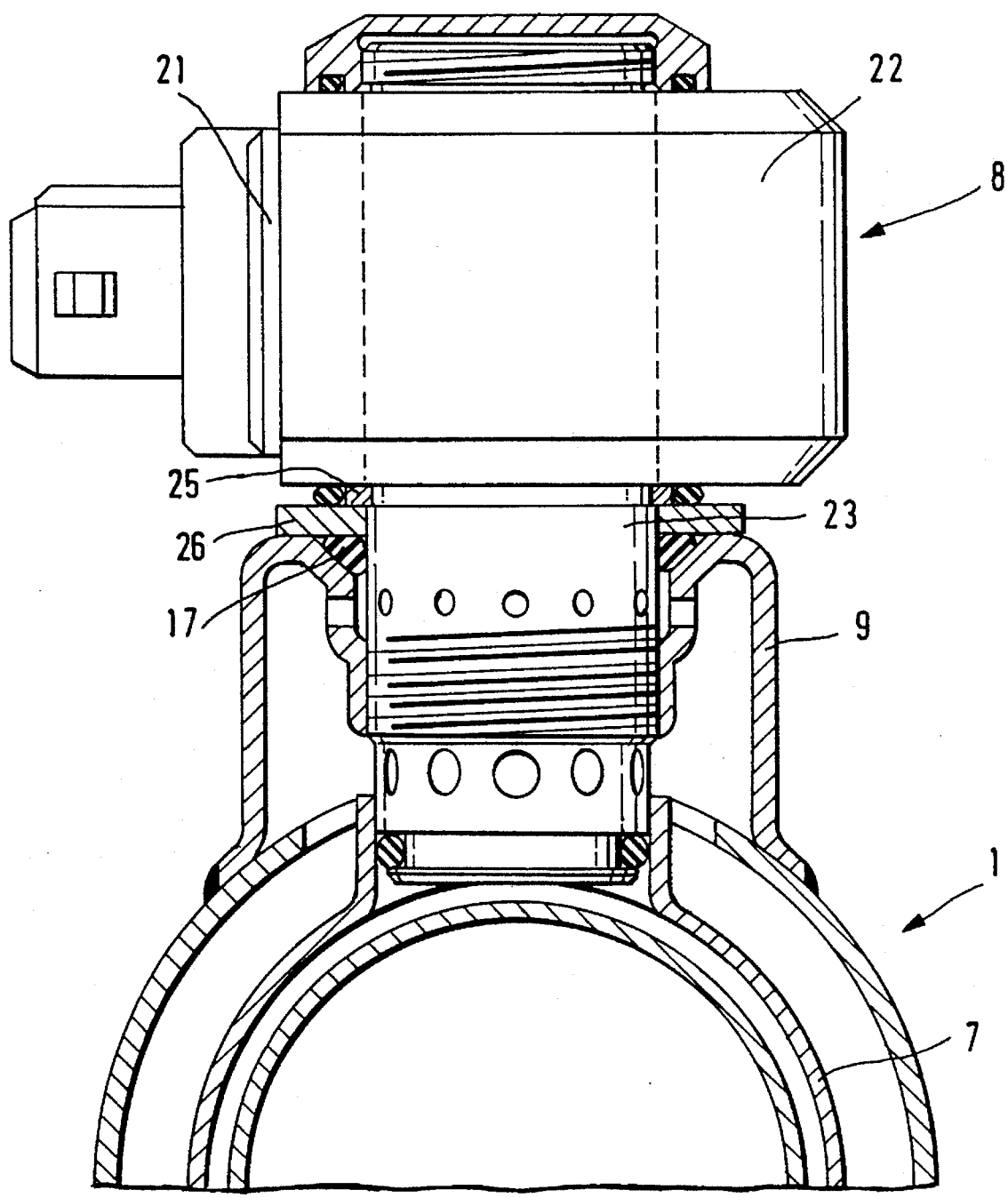
FIG. 6 illustrates an additional embodiment of a damping valve with a corresponding method of securing the valve cartridge.

FIG. 6 shows a shock absorber 1 on which the damping valve 8 is preferably connected to the tube 7 by means of the centering ring 9. The valve cartridge 23 in this embodiment is preferably secured by means of a snap ring 25 and is preferably sealed against the atmosphere by means of a washer 26 and the seal 17. The shock absorber 1 is thus essentially sealed against the atmosphere even after the removal of the coil 21 and of the magnetic return body 22. In this embodiment, it is possible to separate the magnet coil 21 from the shock absorber 1, without the shock absorber 1 suffering an oil loss, since the valve cartridge 23 essentially remains in the centering ring 9. It is also possible to manufacture a purely hydraulic shock absorber 1 without electrical components (magnet coil 21 end magnetic return body 22), or even to replace a defective magnet coil 21 in the vehicle.

It will be appreciated that, in accordance with at least one preferred embodiment of the present invention, the magnet coil 21 may be embodied essentially by any appropriate magnet coil, solenoid, or electromagnet. Because such components are generally well known to those of ordinary skill in the art, they will not be further discussed here. Additionally, in accordance with at least one preferred embodiment of the present invention, snap ring 25 may preferably be embodied by an annular component, positioned above washer 26, and configured to essentially "snap" into a corresponding notch or groove on valve cartridge 23.

Figure 7:
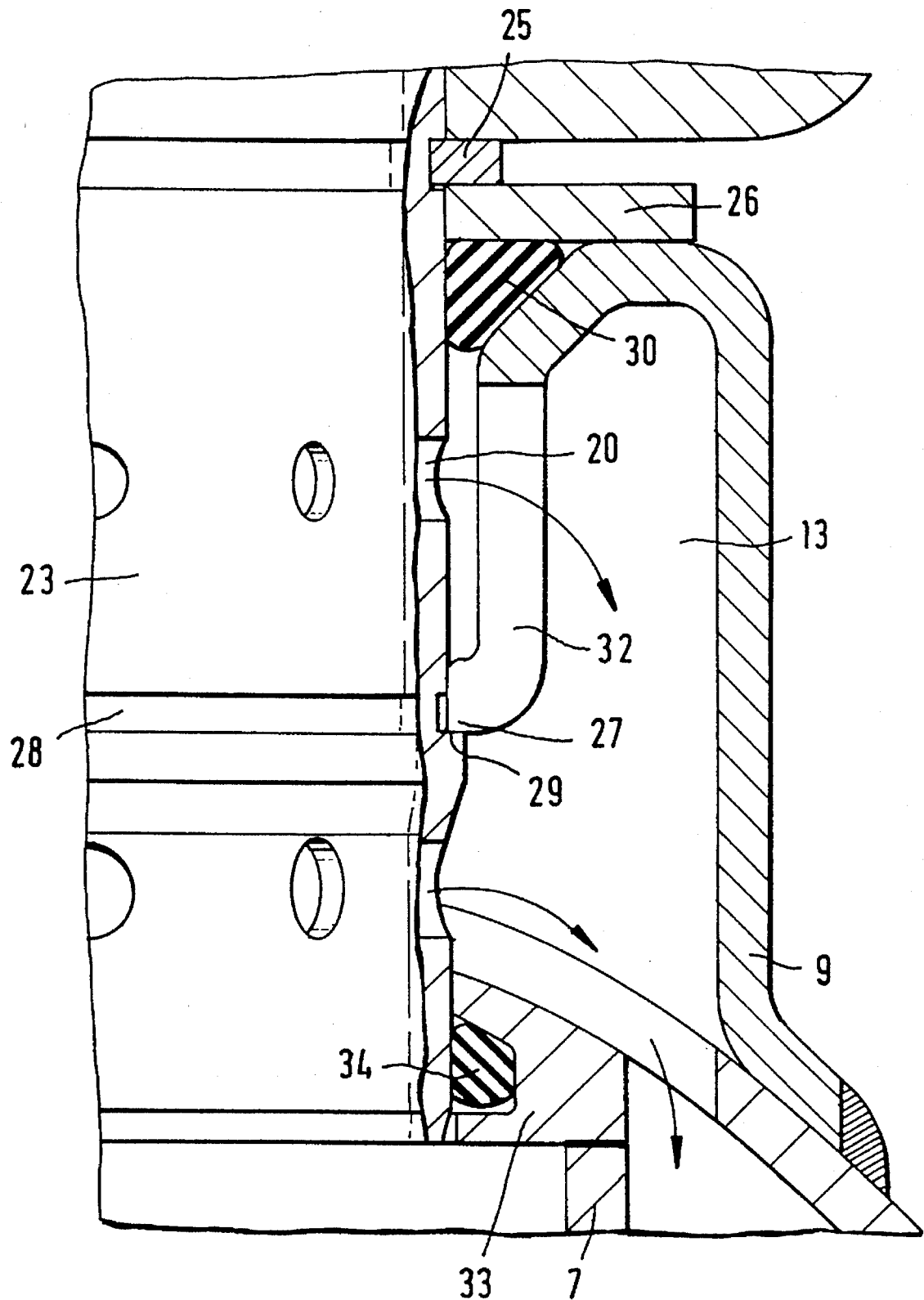
FIG. 7 shows an embodiment with a slotted centering ring.

FIG. 7 illustrates an additional embodiment, which is essentially comparable to the embodiment illustrated in FIG. 6. FIG. 7 differs from FIG. 6 in that, instead of the threaded connection, there is preferably a plug-and-socket or snap connector between the centering ring 9 and the valve cartridge 23. The centering ring 9 is preferably provided with a location hole which has at least one slot 32 distributed around the circumference thereof, so that this area can flex during the assembly of the valve cartridge 23 and thereby come into contact with the contact surface 29. The axial fixing of the valve cartridge 23 is preferably accomplished by means of the washer 26 and the snap ring 25. The elastomer element 30 preferably applies a corresponding axial bias and simultaneously acts as a seal.

But the centering ring can also be provided with corresponding projecting areas 27 which are then engaged additionally, or exclusively, in a corresponding groove 28. The flow connection from the holes 20 into the space 13 is preferably essentially guaranteed by means of the slot 32. The corresponding seal of the valve cartridge 23 against the tube 7 is preferably accomplished by an insert 33 and a corresponding gasket 34.

The centering ring 9 can preferably be designed as a deep drawn part, and, on account of its shape, can preferably be manufactured essentially without any additional machining. The slot 32 preferably gives the location hole 10 a corresponding elasticity, whereby the flow connection between the hole 20 and the space 13 is essentially preferably guaranteed.

Figure 8:
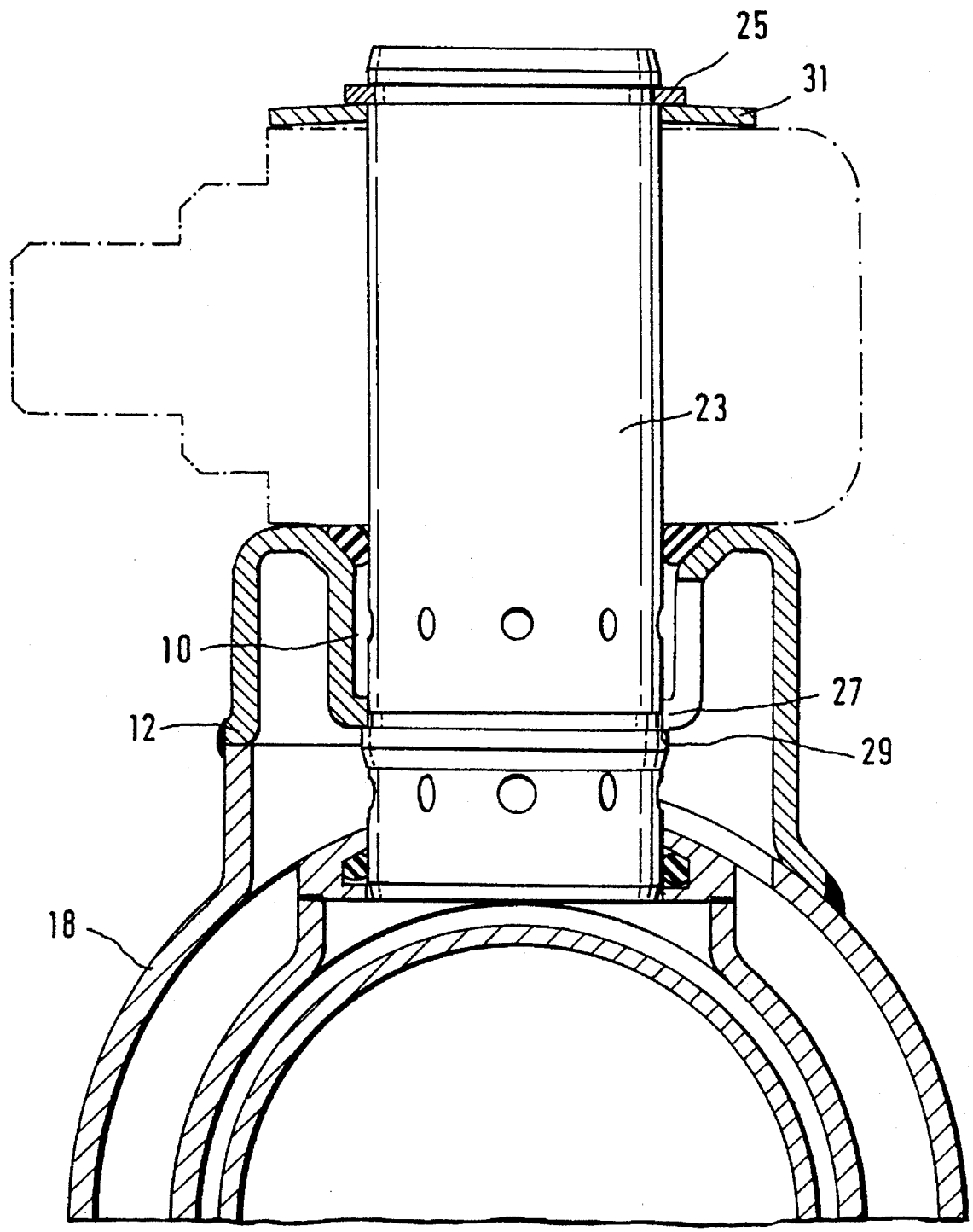
FIGS. 8 and 9 show additional embodiments with different damping valves.

FIG. 8 shows a coil with a plug-and-socket connector, whereby the valve cartridge 23 is preferably pressed into the location hole 10 so that the projecting area 27 comes into contact against the contact surface 29. The valve cartridge 23 is preferably secured by means of the spring lock washer 31 and a snap ring 25. Spring lock washers are generally well known to those of ordinary skill in the art, and will thus not be further described herein.

Figure 9:
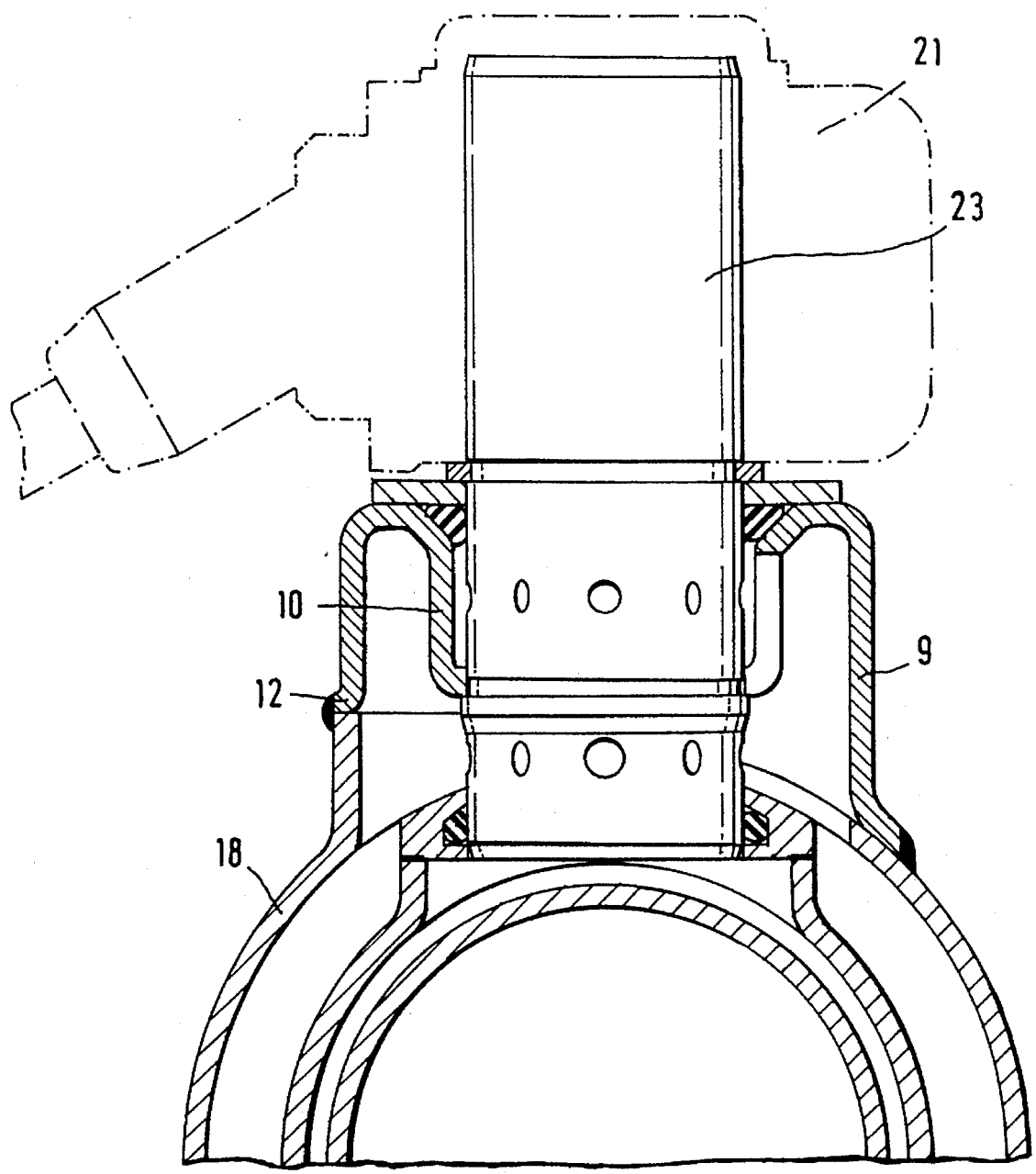

FIG. 9 illustrates an additional embodiment in which the valve cartridge 23 is preferably surrounded by a coil with a cable connection. In the event that the cable of the coil 21 gets in the way during the assembly process on the assembly line, first the valve cartridge 23 is preferably inserted into the location hole 10 of the centering ring 9. The valve cartridge 23 is preferably secured as illustrated in FIG. 6 or FIG. 7. Following the complete assembly of the hydraulic portion, the coil 21 can then preferably be pressed onto the valve cartridge 23 as the final step.

The left halves of FIGS. 8 and 9 essentially illustrate an embodiment in which the jacket tube 18 is mounted projects externally and the centering ring 9 with its flange 12 runs along the external contour. The flange 12 is thereby provided with a plane and surface.

Figure 10:
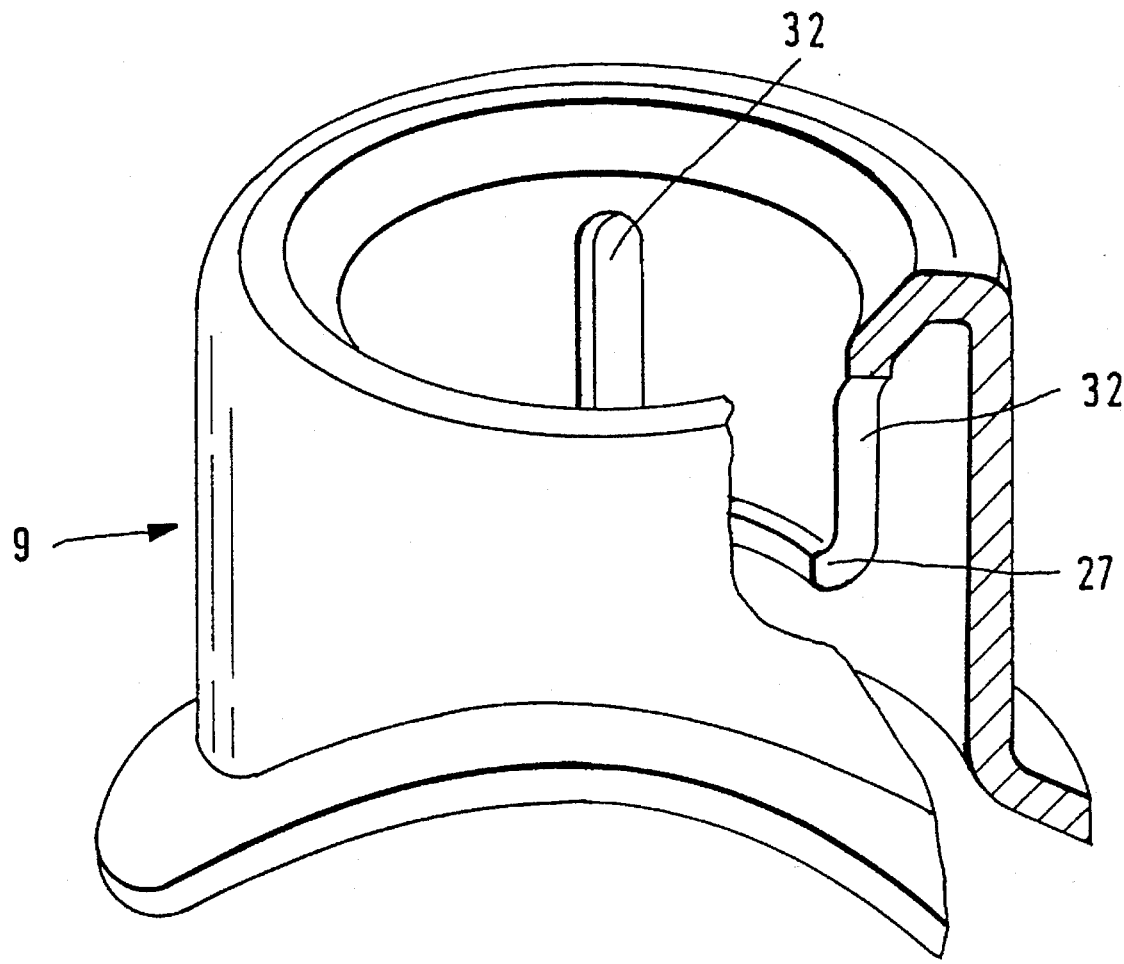
FIG. 10 shows a slotted centering ring in detail.

FIG. 10 shows a detail of a centering ring 9 which is essentially designed like the one illustrated in FIG. 5. The difference is that the location hole 10 is not designed with a threaded portion, but with slots 32 end projecting areas 27 to form a positive connection with the valve cartridge 23. It will be understood that such a "positive connection" may, in accordance with at least one preferred embodiment of the present invention, be considered to be a form-lock or form-fit.

The disclosure now turns to a discussion of components which may be employed within the context of the present invention. It should be understood that the components discussed above with relation to FIGS. 1–10 may, if appropriate, essentially be considered to be interchangeable with similar components discussed herebelow with relation to FIGS. 11–25. Within the context of the present invention, the centering ring 9 discussed hereinabove will preferably be used in place of the collar 103b discussed herebelow.

Figure 11:
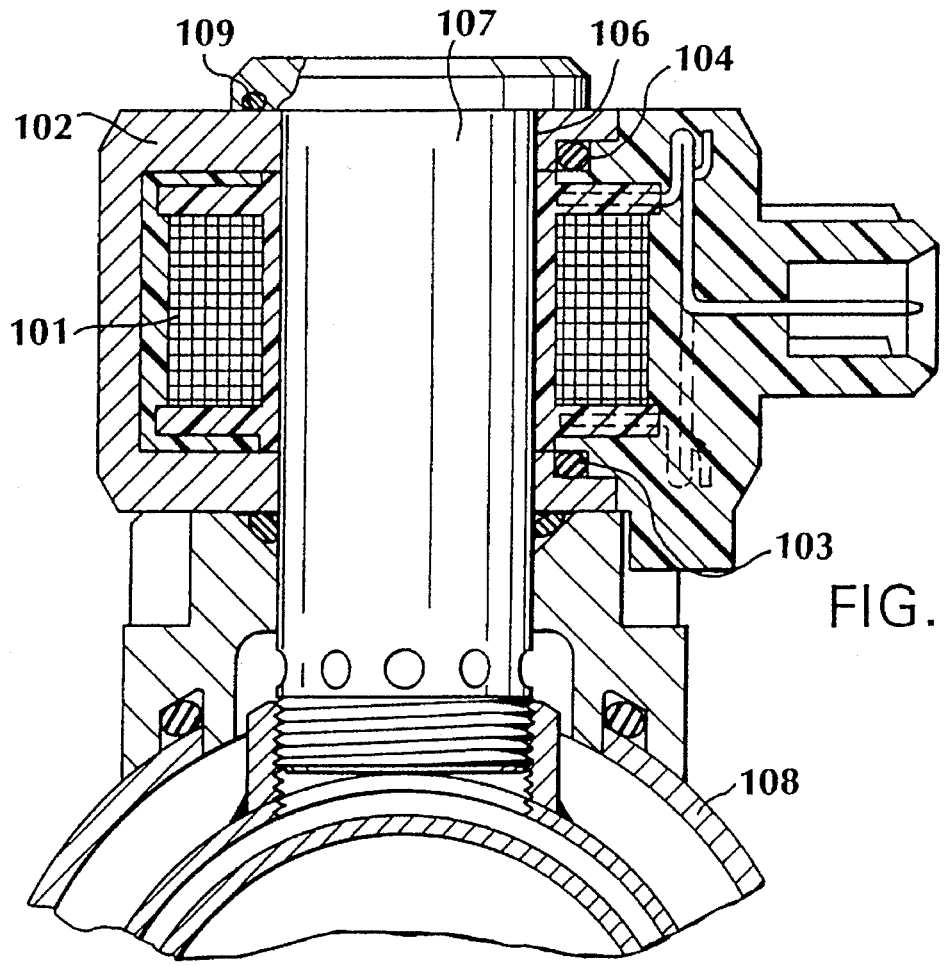
Figure 13:
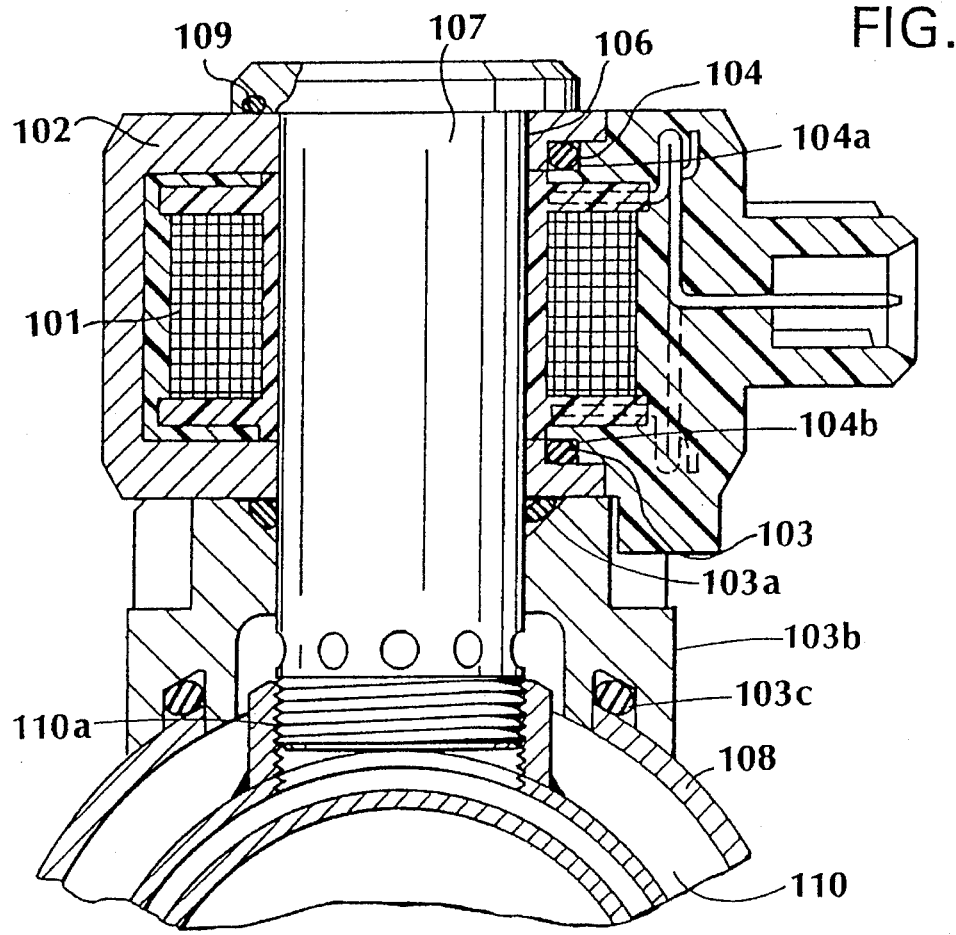

The solenoid valve illustrated in FIGS. 11 and 13 consists essentially of the nonreturn body 102, the coil 101 and the valve casing 107, inside which is the armature of the electromagnetic valve. The solenoid valve is flange-mounted on an external tube 108 of a vibration damper 110.

The nonreturn body 102 may typically be made from a metal which preferably in one embodiment is ferromagnetic. This nonreturn body 102 forms the case for holding the coil assembly 101.

To prevent moisture from getting between the abutting surfaces of the nonreturn body 102 and the coil 101, in the vicinity of the contact surfaces between the valve casing 107 and the coil 101, there is a seal element 103 located in a recess 104. Since the nonreturn body 102 has an additional opening 106 to hold the valve casing 107, there is an additional seal 109 between the nonreturn body 102 and the valve casing 107.

In an additional embodiment, the solenoid valve illustrated in FIG. 13 may be disassembled by first removing the valve casing 107, inside which is the armature of the electromagnetic valve, from a vibration damper 110. After removing the valve casing 107, the coil or coil assembly 101 may in an additional embodiment of the invention then be removed from the nonreturn body 102.

The valve casing 107 is screwed into the vibration damper 110 by means of screw threads 110a. Between the nonreturn body 102 and the external tube 108 of the vibration damper 110 there is a collar 103b which rests against both the nonreturn body 102 and the external tube 108. Between the valve casing 107, the nonreturn body 102 and the collar 103b there is disposed in a recess a seal element 103i al . Additionally between the collar 103b and the external tube 108 there is a disposed seal element 103c. All of the seal elements, that is, seal elements 103, 103a, and 103c may be O-rings.

Figure 12:
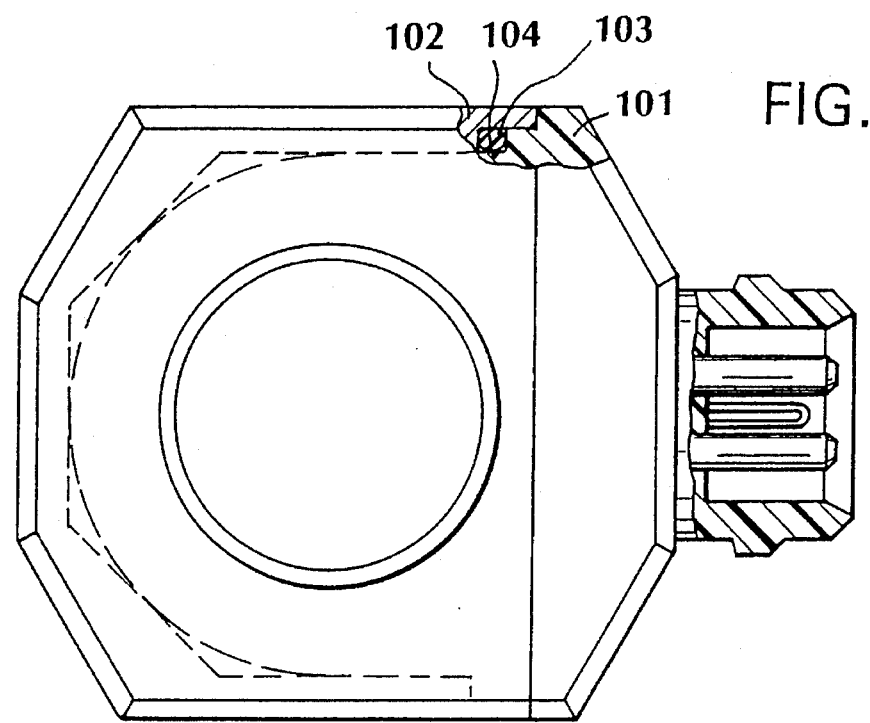

FIG. 12 shows that the nonreturn body 102 and the coil 101 together form a recess 104 into which the seal element 103 is inserted.

In this additional embodiment of the invention, the solenoid valve illustrated in FIG. 13 may be assembled from the parts which are the sealing element 103 and the coil assembly 101 by first inserting the coil assembly 101, with the seal element 103 inserted thereon, in the location of the recess 104 by sliding the coil assembly 101 into the cavity within the nonreturn body 102 applying pressure to the coil assembly 101 preferably to compress the seal element 103 and then sliding the valve casing 107 with its contents down through the hole in the coil assembly 101. The valve casing 107 is then screwed into the vibration damper 110 while the coil assembly 101 is held within the cavity of return body 102 preferably by compressing the seal element 103.

Preferably the surfaces that contact the seal element 103, which is preferably an O-ring, should be at least one of: smooth or highly reflective or polished or mirror like in their surface characteristics. This preferably extremely smooth surface is especially important in the case of the portions of the preferably meal nonreturn body 102 which make contact with the seal element 103 and also in alternative embodiments the preferably plastic surfaces of the coil assembly 101 could preferably also have surfaces with characteristics of a similar nature as those of the nonreturn body 102. The bright surface characteristics may be in various embodiments of varying smoothness depending upon among other factors upon the characteristics of the seal element 103. The smooth surfaces may have a smoothness in the order of a few microns of roughness and may in certain embodiments be one, two, three, four, five, ten, twenty, fifty, one hundred microns or any of the ranges between these values or may be one-tenth or one-hundredth of these values, alternatively these roughnesses may be ten or one hundred times larger.

The other seals and sealing elements described below may also in some embodiments be held in recesses that have the same or similar surface characteristics as those of recess 104.

The seal element 103 and the surfaces which comprise the recess 104 which receive the seal element 103 preferably form a generally rectangular cavity which extends perpendicular to the paper of the view of FIG. 11. This extension into the paper is in one embodiment substantially straight, that is, extending from one side of the coil assembly 101 and the nonreturn body 102 to the other side.

Figure 14:
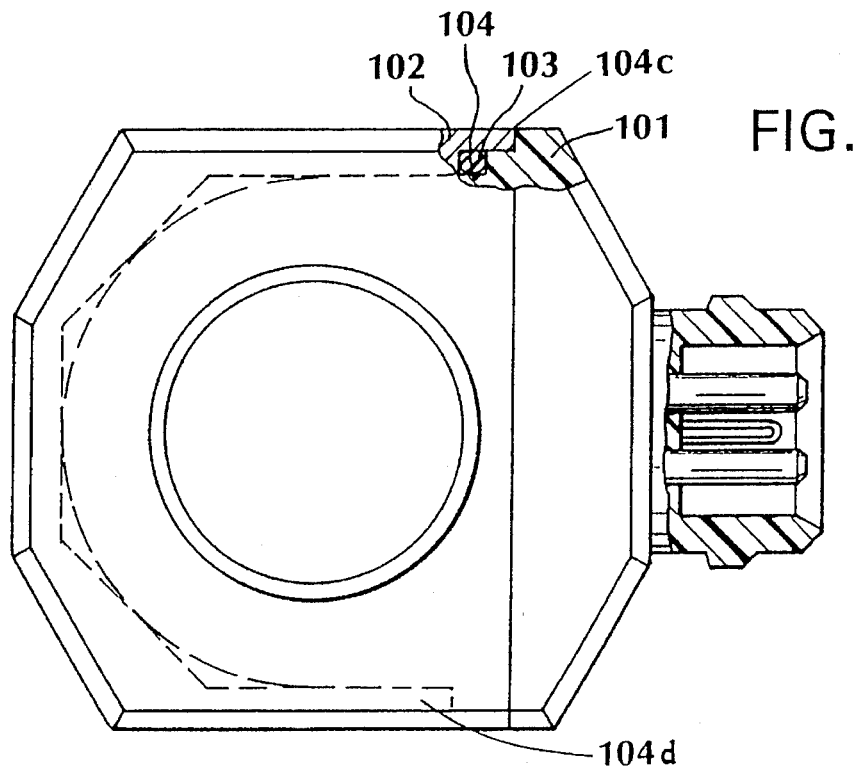
Figure 15:
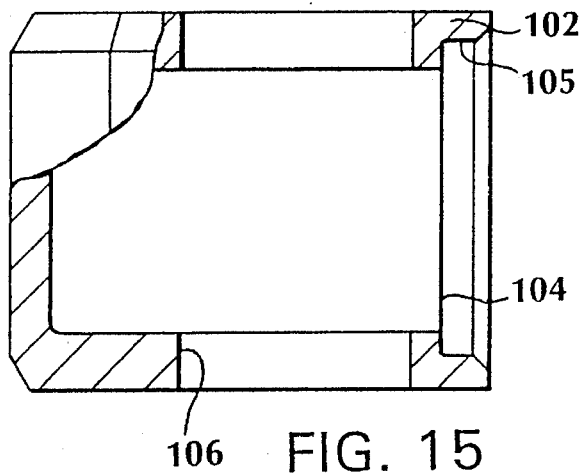
Figure 16:
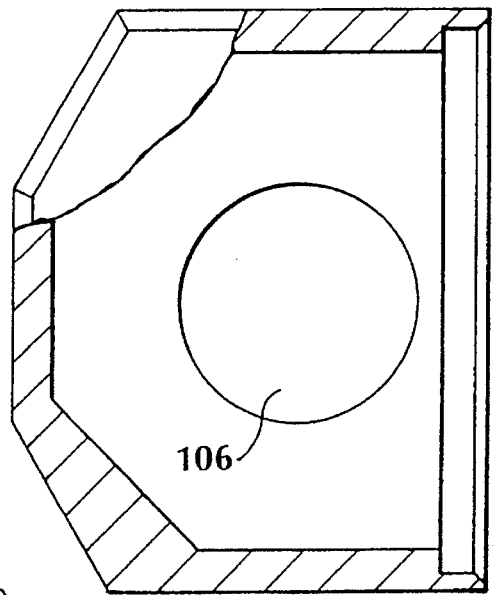
Figure 17:
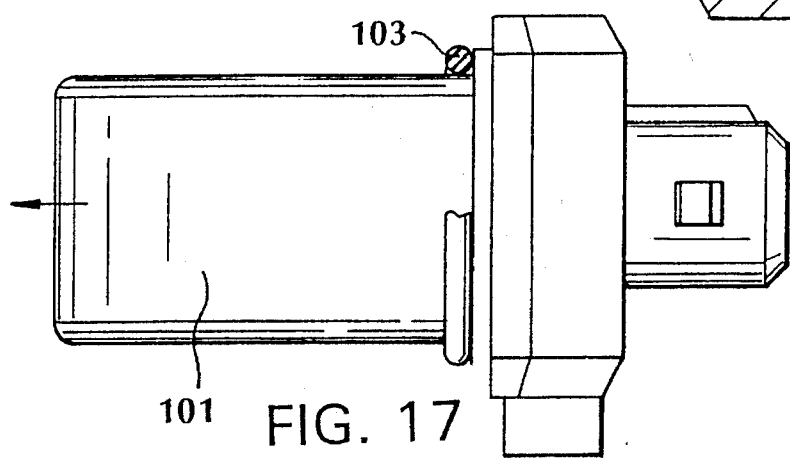

In FIG. 14 the recess 104 and seal element 103 are also shown extending into the plane of the paper of FIG. 12. The sealing element 103 and the recess 104 extend in one embodiment substantially straight from the top of the seal element shown in FIG. 11 to the bottom of the seal element shown in FIG. 11 on both sides of the nonreturn body 102 and the coil assembly 101 as shown in FIG. 12. In other words, as shown in FIG. 12, the seal element extends from the lower portion of FIG. 12 to the upper portion where the cross-hatched area is shown. Then, the seal element extends from the top to he bottom of the nonreturn body 102, that is, as shown in FIG. 13 from the top of the coil assembly 104a to the bottom of the coil assembly 104b in the section that forms the recess 104. The sealing element 103 then extends across the bottom of the recess 104 as shown in the coil assembly 104b, that is between recess portion 104c and recess portion 104d, as shown in FIG. 14. The seal element then extends up though recess portion 104d between coil assembly 104b and coil assembly 104a as shown in FIG. 13. Therefore, in one embodiment, the seal element 103 assumes a substantially rectangular shape when traversing the substantially rectangular recess 104 which holds the seal element 103.

Figure 19:
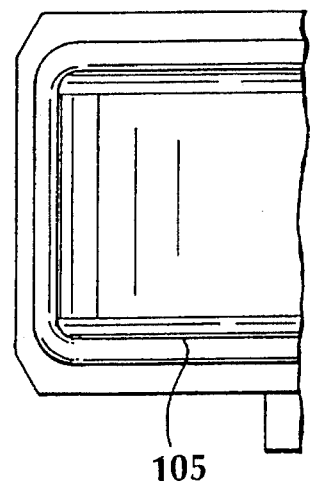
Figure 18:
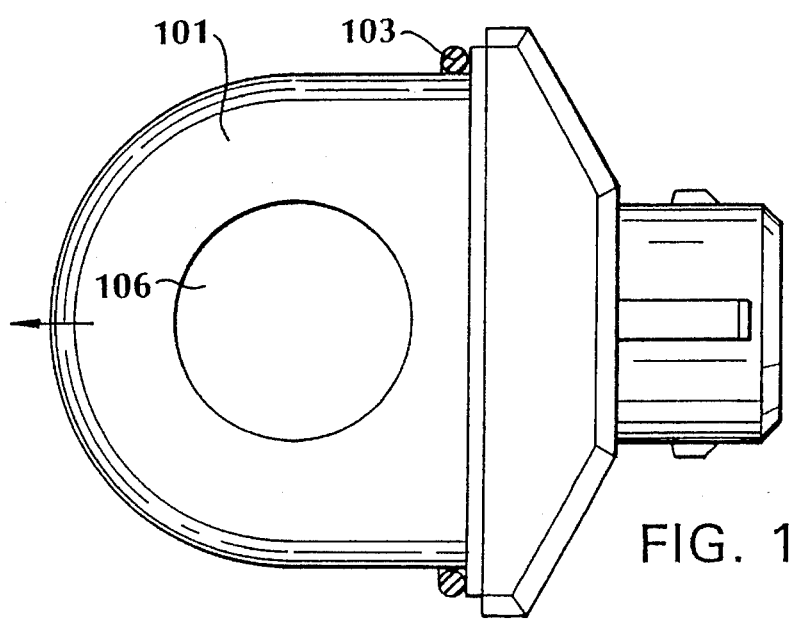

FIGS. 15 to 19 show the nonreturn body 102 as an isolated part, whereby the recess 104 which forms the seal seat 105 is used to hold the seal element 103. FIG. 19 shows that the seal seat 105 has the form of an approximately rectangular seal seat 105 which is not circular. In these embodiments, the coil 101 is inserted laterally into the nonreturn body 102, whereby the openings 106 are used to hold the valve casing, and are also sealed against the atmosphere by means of the seal 109 (FIG. 11).

Figure 20:
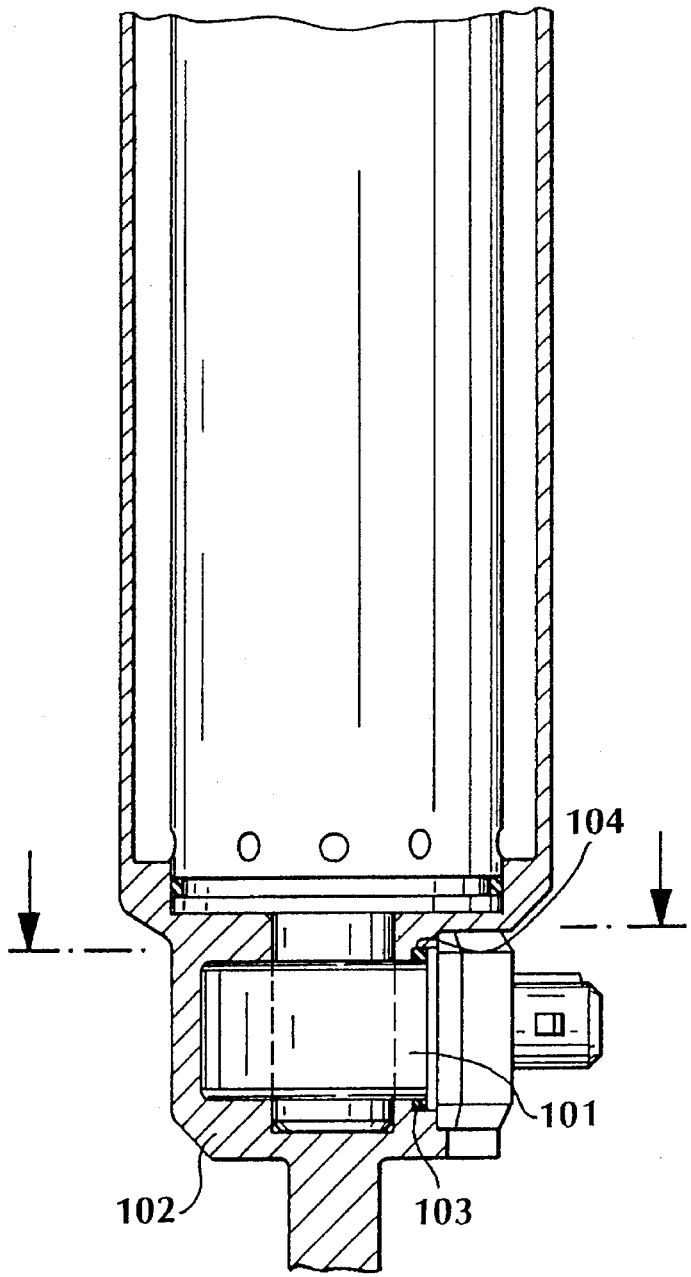
Figure 21:
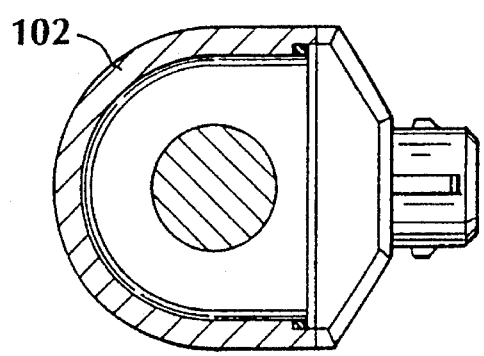

FIGS. 20 and 21 show a solenoid valve in which the coil 101 is located in the bottom of a vibration damper, whereby the nonreturn body 102 is formed directly by the vibration damper itself. In this embodiment, too, a corresponding seal element 103 is inserted into a recess 104, so that no or virtually no moisture from the atmosphere can penetrate into the solenoid valve.

Figure 22:
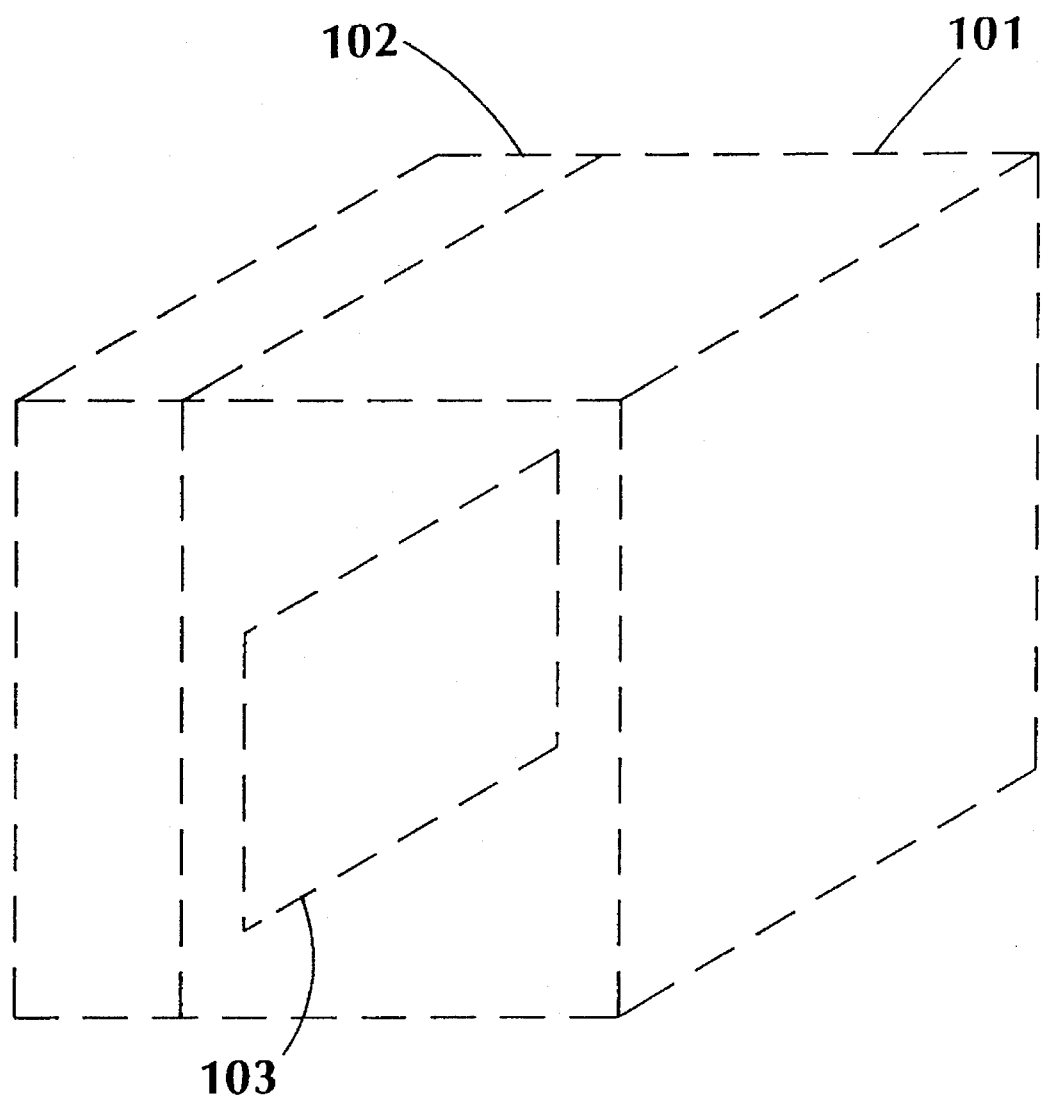

Referring now to FIG. 22, the coil assembly 101 and nonreturn body 102 are shown in phantom with the rectangular recess 104 (not shown) and the rectangularly shaped seal element 103, shaped rectangular by the recess 104 (not shown), enclosed within the assembled coil assembly 101 and the nonreturn body 102.

Figure 23:
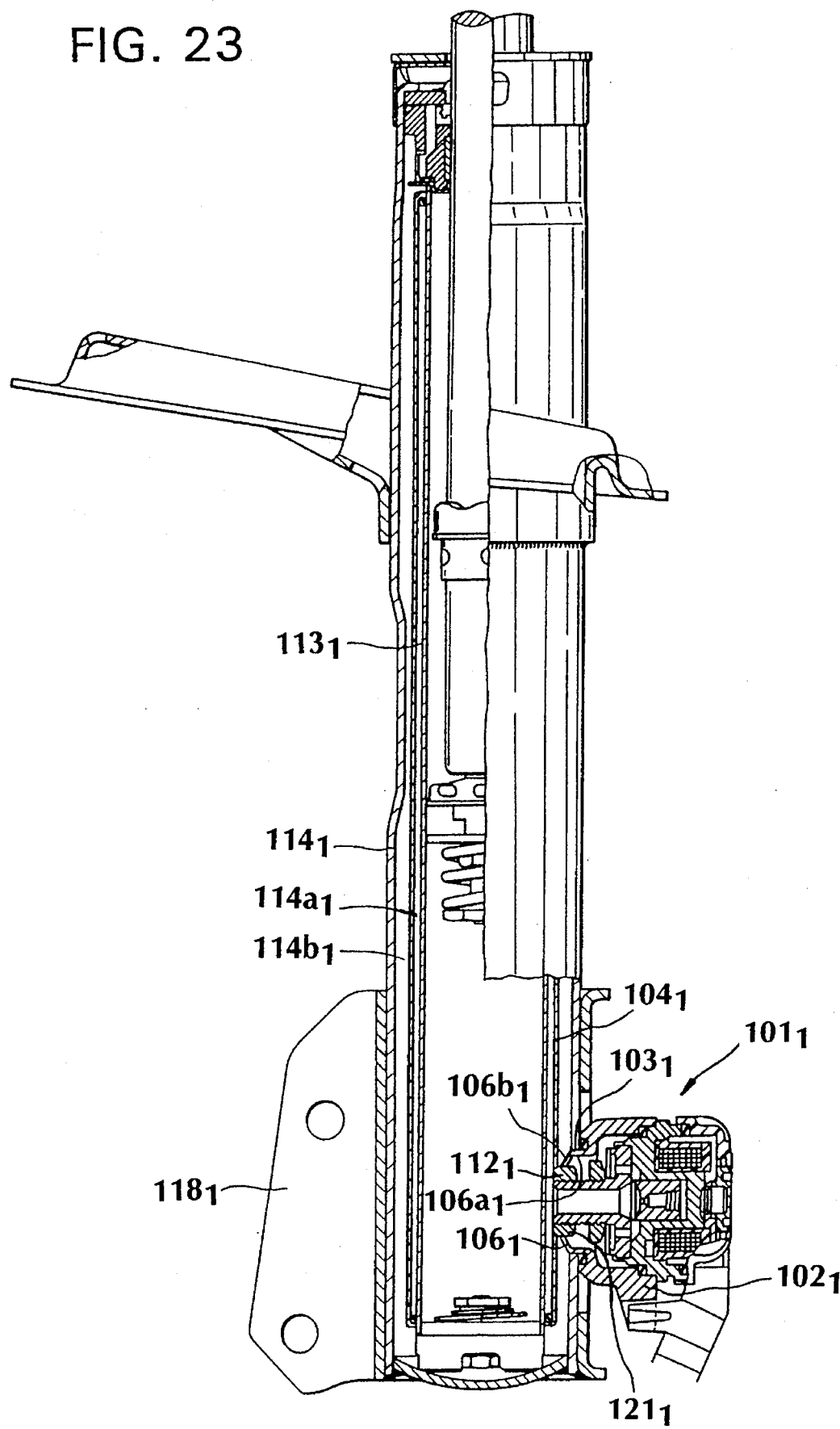

FIG. 23, which is based on a conventional vibration damper like the one illustrated in FIG. 11, shows a version in which a damping valve $101_1$ is installed on the side. This damping valve $101_1$ is located in the vicinity of the bracket $118_1$. The only difference from the conventional vibration damper illustrated in FIG. 1 is that in the equalization chamber between the work cylinder $113_1$ and the jacket tube $114_1$ there is an additional tube $104_1$, which is equipped with a threaded ring $112_1$, so that all that is required for the installation of the damping valve $101_1$ is a hole $103_1$ in the jacket tube $114_1$. By means of the centering ring $102_1$, which is centered with its extension $106_1$ in the hole $103_1$ of the jacket tube $114_1$, and by means of the screw fitting which runs through the centering ring $102_1$ on the threaded ring $112_1$, the damping valve $101_1$ can be used with a minimum of effort and expense on a conventional vibration damper like the one illustrated in FIG. 11.

Figure 24:
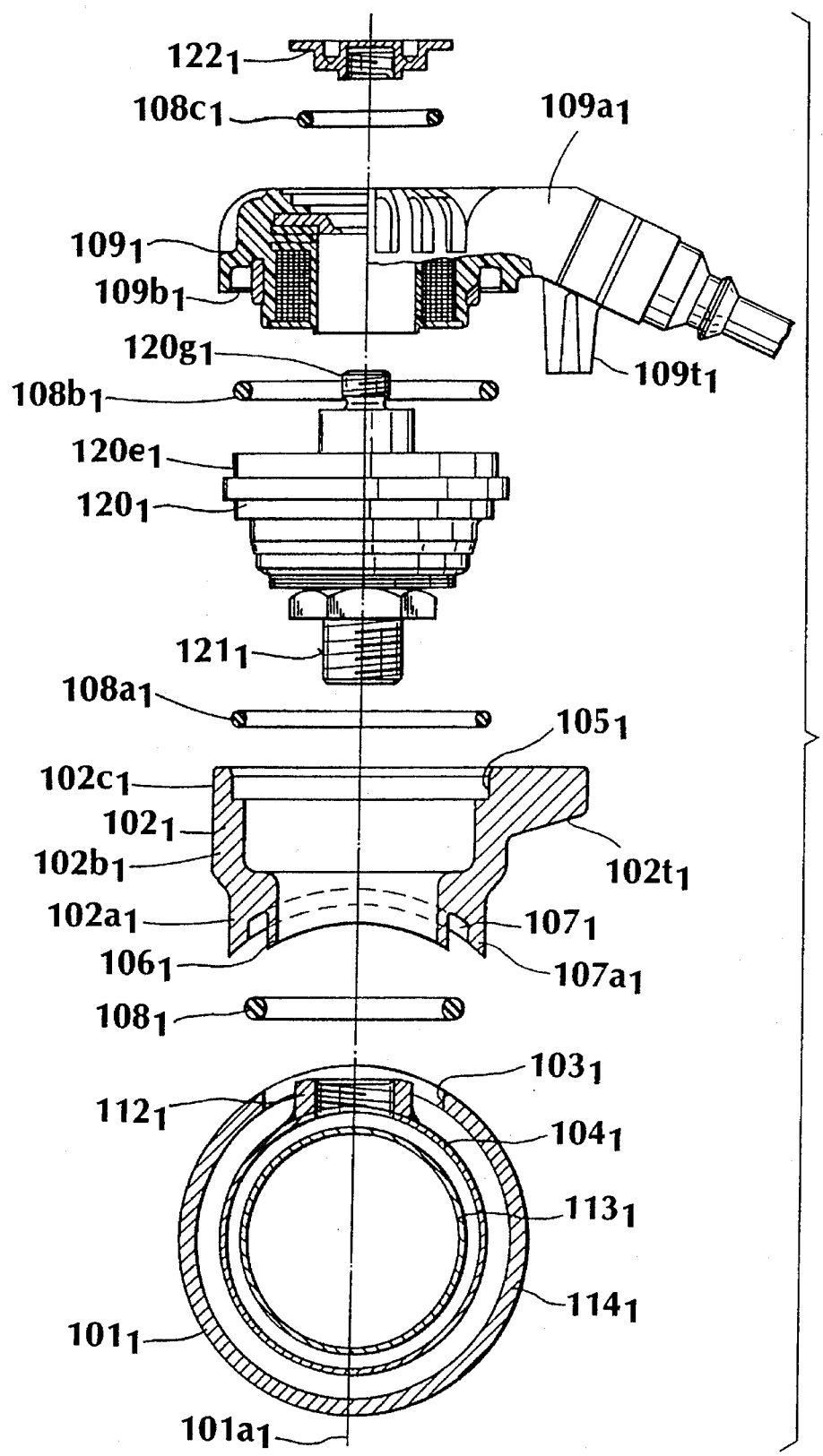

In FIG. 24, which shows the work cylinder $113_1$ and the jacket tube $114_1$, the tube $104_1$ is located inside the equalization chamber and is equipped with a threaded ring $112_1$. To this base, the gasket $108_1$, the centering ring $102_1$, an additional gasket, the valve core $120_1$ and finally the housing $109_1$ with the electrical parts are threaded on.

By means of the screw fitting $121_1$, the valve core $120_1$ with the centering ring $102_1$ is held by means of the threaded ring $112_1$ in the tube $104_1$, while an additional screw fitting $122_1$ fixes the housing $109_1$ in relation to the valve core $120_1$. The centering ring $102_1$ is provided with a groove $107_1$ to hold the gasket $108_1$ and with an extension $106_1$ for centering in the hole $103_1$ of the jacket tube $114_1$. As a result of the screw fitting $121_1$, which extends through the centering ring $102_1$, a proper seal of the centering ring $102_1$ with the gasket $108_1$ against the outer surface of the jacket tube $114_1$ is guaranteed. To hold the valve core $120_1$, the centering ring $102_1$ is provided with an additional hole $105_1$.

FIG. 23, which is based on a conventional vibration damper like the one illustrated in FIG. 1, shows a version in which a damping valve $101_1$ is installed on the side of the vibration damper. This damping valve $101_1$ is located in the vicinity of the bracket $118_1$. There may be only two modifications to a conventional vibration damper like the one illustrated in FIG. 1 required in order to be able to install the damping valve $101_1$ on the side of the vibration damper. One modification may be the addition of the tube $104_1$ which is equipped with the threaded ring $112_1$. The threaded ring $112_1$ has an inside radial edge. Preferably the tube $104_1$ has a hole aligned with the inside redial edge of the threaded ring $112_1$. Such a hole in the tube $104_1$ would allow damping fluid to flow between the damping valve $101_1$ and one or two of the work chambers of the work cylinder $113_1$. The other modification may be the cutting of the hole $103_1$ in the jacket tube $114_1$. Preferably the hole $103_1$ is centered on the threaded ring $112_1$. By means of the centering ring $102_1$, which is centered with its extension $106_1$ in the hole $103_1$ of the jacket tube $114_1$, and by means of the screw fitting $121_1$ which runs through the centering ring $102_1$ on the threaded ring $112_1$, the damping valve $101_1$ can be installed with a minimum of effort and expense on a conventional vibration dumper like the one illustrated in FIG. 1.

As shown in FIG. 23, the tube $104_1$ may divide the equalization chamber into an equalization subchamber $114a_1$ inside the tube $104_1$ and an equalization subchamber $114b_1$ outside the tube $104_1$. The extension $106_1$ is shown as having a cylindrical section $106a_1$ extending through the jacket tube $114_1$ from outside. The extension $106_1$ is also shown as having a conical section $106b_1$ extending from the cylindrical section $106a_1$ inward toward the tube $104_1$ end inward radially with respect to the cylindrical section $106a_1$. The conical section $106b_1$ is shown as contacting the threaded ring $112_1$ on the outer circumferential surface of the threaded ring $112_1$. The conical section $106b_1$ may facilitate centering the centering ring $102_1$ on the threaded ring $112_1$. The conical section $106b_1$ preferably does not contact the threaded ring $112_1$ around the entire circumference of the threaded ring $112_1$. In some embodiments it may be preferable or necessary that a gap between the extension $106_1$ and the threaded ring $112_1$ be a part of e passage through the damping valve $101_1$ to the equalization subchamber $114a_1$.

FIG. 24 shows the work cylinder $113_1$, the tube $104_1$ and the jacket tube $114_1$ generally substantially equivalent to those same components shown in FIG. 11 and FIG. 23, as being substantially coaxial and therefore having substantially coinciding longitudinal axes. An axis $101a_1$ preferably passes through the longitudinal axis of the tube $104_1$ and is transverse, preferably perpendicular, to the longitudinal axis of the tube $104_1$.

The tube $104_1$ is preferably equipped with a threaded ring $112_1$. The threaded ring $112_1$ is preferably centered on axis $101a_1$. The threaded ring $112_1$ has an inner radial surface and an outer radial surface. Preferably the inner radial surface of the threaded ring $112_1$ is threaded and the outer radial surface of the threaded ring $112_1$ is not. The threaded ring $112_1$ is preferably rigidly attached to the tube $104_1$ by welding or some other means. Any welds between the threaded ring $112_1$ and the tube $104_1$ are preferably on the outer radial surface of the threaded ring $112_1$. The jacket tube $114_1$ has an inner surface and an outer surface. The threaded rang $112_1$ preferably extends from the tube $104_1$ past the inner surface of the jacket tube $114_1$, but not past the outer surface of the jacket tube $114_1$.

The tube $104_1$ preferably has a hole centered on axis $101a_1$, which hole preferably is aligned with the inside radial surface of the threaded ring $112_1$.

The hole $103_1$ in the jacket tube $114_1$ is preferably centered on axis $101a_1$. The hole $103_1$ preferably is shaped such that the entire edge of the hole $103_1$ would contact a cylinder inserted into the hole $103_1$ with the longitudinal axis of the cylinder oriented parallel to axis $101a_1$. Therefore, the hole $103_1$ preferably appears circular when viewed from a distance along axis $101a_1$.

The centering ring $102_1$ is preferably centered on axis $101a_1$. The centering ring $102_1$ has a first end and a second end along axis $101a_1$, with the first end being adjacent to the jacket tube $114_1$. The first end of the centering ring $102_1$ has an extension $106_1$. The extension $106_1$ is preferably centered on axis $101a_1$ and cylindrical. The extension $106_1$ has an outer radial surface, which outer radial surface has a diameter, which diameter is such that the extension $106_1$ can fit, preferably snugly, into the hole $103_1$. Preferably the extension $106_1$ extends from outside the jacket tube $114_1$ to the inner surface of the jacket tube $114_1$. Preferably the extension $106_1$ is flush with the inner surface of the jacket tube $114_1$ and follows the contour of the inner surface of the jacket tube $114_1$. Therefore, extension $106_1$ has an edge which edge preferably is shaped such that the entire edge would contact a cylinder having a longitudinal axis parallel to the longitudinal axis of the tube $104_1$.

The first end of the centering ring $102_1$ preferably has an extension $107a_1$. The extension $107a_1$ is preferably centered on axis $101a_1$ and cylindrical. The extension $107a_1$ has an inner radial surface, which inner radial surface has a diameter, which diameter is greater than the diameter of the outer radial surface of the extension $106_1$. The extension $107a_1$ preferably follows the contour of the outer surface of the jacket tube $114_1$. Preferably the extension $107a_1$ is the part of the centering ring $102_1$ that rests against the outer surface of the jacket tube $114_1$ and thereby prevents the centering ring $102_1$ from moving closer to the tube $104_1$.

The first end of the centering ring $102_1$ preferably has a groove $107_1$. The groove $107_1$ is preferably centered on axis $101a_1$ and cylindrical. The groove $107_1$ is preferably formed by the inner radial surface of the extension $107a_1$ and the outer radial surface of the extension $106_1$. The dimensions of the groove $107_1$ are preferably such that effective seal between the centering ring $102_1$ and the jacket tube $114_1$ can be created by a gasket $108_1$ inserted in the groove $107_1$.

The centering ring $102_1$ has a hole $105_1$. The hole $105_1$ is preferably centered on axis $101a_1$. The hole $105_1$ may have sections having different diameters, and therefore the centering ring $102_1$ may have corresponding sections having different inside diameters. The configuration of the hole $105_1$ for a particular embodiment of the invention may be strongly influenced by the design of the valve core used in the particular embodiment. In the embodiment shown in FIG. 24, the centering ring $102_1$ has a first section $102a_1$ having a first inside diameter at the first end of the centering ring $102_1$. The first section $102a_1$ of the centering ring $102_1$ extends from the first end toward the second end of the centering ring $102_1$ past the extension $106_1$. Further from the first end of the centering ring $102_1$, the centering ring $102_1$ has a second section $102b_1$ having a second inside diameter, the second inside diameter being greater than the first inside diameter. Still further from the first end of the centering ring $102_1$, the centering rang $102_1$ has a third section $102c_1$ having a third inside diameter, the third inside diameter being greater than the second inside diameter. The centering ring $102_1$ has an annular surface between the second section $102b_1$ and the third section $102c_1$. Preferably the gasket $108a_1$ can be placed on the annular surface between the second section $102b_1$ and the third section $102c_1$ to form a seal between the centering ring $102_1$ and the valve core $120_1$. Finally, the centering ring $102_1$ may have a chamfer adjacent to the hole $105_1$ at the second end of the centering ring $102_1$. The chamfer might facilitate the insertion of the valve core $120_1$ into the hole $105_1$.

The outside diameter of the centering ring $102_1$ may vary. The centering ring $102_1$ preferably has at least one tab $102t_1$. The tab $102t_1$ preferably extends radially outward from the outer surface of the centering ring $102_1$. The tab $102t_1$ is preferably on the second end of the centering ring $102_1$.

The valve core $120_1$ is preferably centered on axis $101a_1$. The valve core $120_1$ has a first end and a second end along axis $101a_1$, with the first end being located between the work cylinder $113_1$ and the second end. The first end of the valve core $120_1$ preferably has a screw fitting $121_1$. The screw fitting $121_1$ is preferably rigidly attached to the valve core $120_1$. The screw fitting $121_1$ has a length along axis $101a_1$. The screw fitting $121_1$ is preferably hollow along the entire length of the screw fitting $121_1$. Preferably the screw fitting $121_1$ has an inner radial surface and an outer radial surface. Preferably the outer radial surface of the screw fitting $121_1$ is threaded and the inner radial surface of the screw fitting $121_1$ is not. Preferably the screw fitting $121_1$ is threaded such that the screw fitting $121_1$ and the threaded ring $112_1$ may threadedly engage each another.

The second end of the valve core $120_1$ preferably has a screw fitting $120g_1$. The screw fitting $120g_1$ is preferably rigidly attached to the valve core $120_1$. The screw fitting $120g_1$ has an outer radial surface. Preferably the outer radial surface of the screw fitting $120g_1$ is threaded.

The valve core $120_1$ has a first outer radial surface. The first outer radial surface of the valve core $120_1$ may have several sections having different diameters. The valve core $120_1$ may have an annular portion $120e_1$.

The damping valve $101_1$ preferably has a housing $109_1$ containing the electrical parts of the damping valve $101_1$. The housing $109_1$ is preferably centered on axis $101a_1$. The housing $109_1$ has a first end and a second end along axis $101a_1$, with the first end being located between the work cylinder $113_1$ and the second end. The electrical parts preferably are disposed in the housing $109_1$ at the first end of the housing $109_1$. The first end of the housing $109_1$ preferably has a groove $109b_1$ located radially outside the electrical parts. Preferably the damping valve $101_1$ has a gasket $108b_1$. Preferably the gasket $108b_1$ is disposed in the groove $109b_1$. Preferably the annular portion $120e_1$ of the valve core $120_1$ can be disposed in the groove $109b_1$ over the gasket $108b_1$, thereby forming a seal between the valve core $120_1$ and the housing $109_1$.

The housing $109_1$ preferably has an electrical socket $109a_1$. Preferably the electrical socket $109a_1$ extends radially outward from the housing $109_1$. In the embodiment shown in FIG. 24, the housing $109_1$ preferably has two tabs $109t_1$. Preferably there is a space between the two tabs $109t_1$. Preferably the space between the two tabs $109t_1$ is aligned with the tab $102t_1$ of the centering ring $102_1$. Preferably the tab $102t_1$ can snugly fit in the space between the two tabs $109t_1$, thereby protecting the housing $109_1$ from twisting relative to the centering ring $102_1$. The two tabs $109t_1$ ay be disposed on the electrical socket $109a_1$. The centering ring $102_1$ may have more than one tab $102t_1$ around the circumference of the centering ring $102_1$ so that the housing $109_1$ may be placed at more than one position where the housing $109_1$ is protected from twisting relative to the centering ring $102_1$.

The electrical parts are preferably aligned on axis $101a_1$ The housing $109_1$ is preferably hollow along axis $101a_1$ such that the second end of the valve core $120_1$ may be inserted into the housing $109_1$ radially inside the electrical parts.

The damping valve $10_{11}$ preferably has a screw fitting $122_1$. The screw fitting $122_1$ preferably has an inner radial surface, which inner redial surface is preferably threaded such that the screw fitting $122_1$ and the screw fitting $121_1$ may threadedly engage each other. The damping valve $101_1$ preferably has a gasket $108c_1$. The second end of the housing $109_1$ preferably has a recess such that the gasket $108c_1$ my be disposed in the recess, and such that the screw fitting $122_1$ may be disposed over the gasket $108c_1$ and tightened onto the screw fitting $121_1$, thereby sealing the second end of the housing $109_1$.

Figure 25:
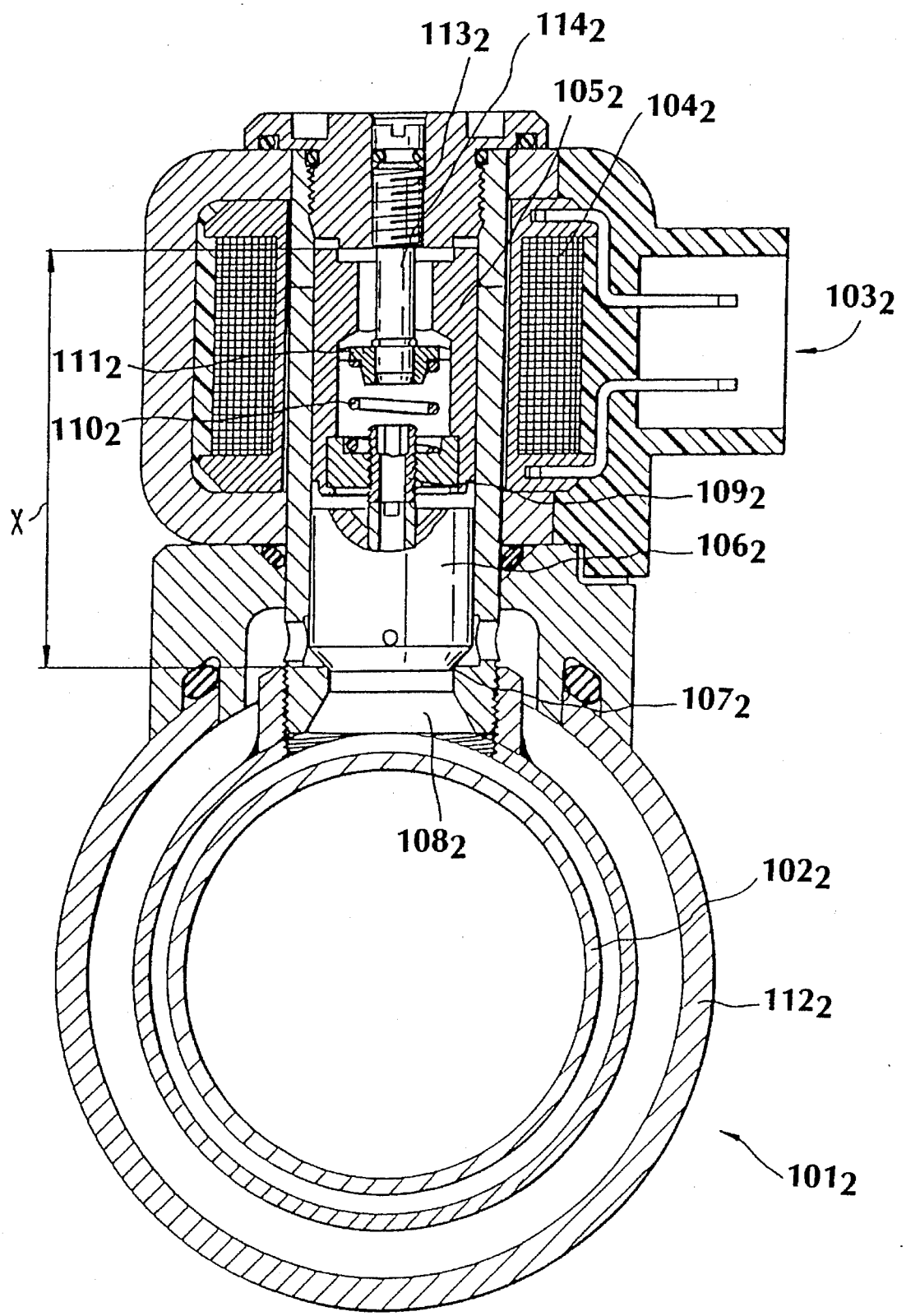

The embodiment illustrated in FIG. 25 shows a vibration damper 1012, of generally the same type as shown in FIG. 1, in cross section, wherein for purposes of simplification, the work piston and the piston rod are not shown. The work cylinder $102_2$ is surrounded by a jacket tube $112_2$, on the outer circumferential surface of which there is an electrically controllable damping valve $103_2$. The electrically controllable damping valve $103_2$ comprises in particular the coil $104_2$, the armature $105_2$ and the valve body $106_2$. The valve body $106_2$ forms a valve seat $107_2$, so that the flow passage $108_2$ can be opened or closed.

The armature $105_2$ is equipped with an adjusting screw $109_2$, so that by means of an appropriate adjustment of the valve body $106_2$, contact takes place. By means of an appropriate setting of the adjusting screw $109_2$, an appropriate distance X can be set from the valve seat $107_2$ to the upper end surface of the armature $105_2$, so that the valve stroke can be correctly adjusted. Before the plugs $113_2$ are installed, suitable tools can be used through the hole in the plugs $113_2$ to adjust the hexagonal socket of the adjusting screw $109_2$, so that the relative distance X can be set.

By means of the spring $110_2$ and the stop plate $111_2$, the prestress of the valve body $106_2$ can be set by installing the plugs $113_2$ at an appropriate distance on the pin $114_2$.

This embodiment relates to a piloted damping valve, wherein the individual parts which are necessary for the pilot control are located inside the inner chamber of the valve body $106_2$.

Now referring to FIG. 25, this figure shows the internal structure of an electromagnetic valve with the internal structure within the valve casing $107_2$ shown in detail. This FIG. 25 does not show the seal element 103 nor the recess 104 as shown in FIG. 11 but could be incorporated therein in one embodiment.

One feature of the invention resides broadly in the hydraulic, adjustable shock absorber, in particular for motor vehicles, with a work cylinder, a piston fastened to a piston rod and dividing the work cylinder into two work chambers, at least one additional surrounding tube coaxial to the work cylinder, and at least one adjustable damping valve located in a sealed and stationary manner on the side of the shock absorber, whereby a centering ring fixes the damping valve, characterized by the fact that the centering ring 9 has e location hole 10 which is surrounded at some radial distance by a wall 11, whose end facing the work cylinder 2 is provided with a flange 12 which corresponds to the external contour of the jacket tube 18.

Another feature of the invention resides broadly in the shock absorber, characterized by the fact that the flange 12 is welded to the jacket tube 18.

Yet another feature of the invention resides broadly in the shook absorber, characterized by the fact that the centering ring 9 is designed as a deep drawn part.

Still another feature of the invention resides broadly in the shock absorber, characterized by the fact that the flange 12 is manufactured by stamping.

Still yet another feature of the invention resides broadly in the shock absorber, characterized by the fact that the space 13 between the location hole 10 and the wall 11 is designed as a passage.

Yet still another feature of the invention resides broadly in the shock absorber, characterized by the fact that the location hole 10 has an expanded portion 14 adjacent radially outward to a threaded portion.

Still another feature of the invention resides broadly in the shock absorber, characterized by the fact that the expanded portion 14, together with the damping valve 8, forms the boundary of a flow passage.

Yet another feature of the invention resides broadly in the shock absorber, characterized by the fact that the expanded portion 14 is provided with holes 16 which connect the space 13 to the flow passage 15.

Still yet another feature of the invention resides broadly in the shock absorber, characterized by the fact that the expanded portion 14 is provided with a seal 17.

Another feature of the invention resides broadly in the shock absorber, characterized by the fact that the location hole 10 is slotted.

Still another feature of the invention resides broadly in the shock absorber, characterized by the fact that the terminal portion of the location hole 10, together with the valve cartridge 23, forms a positive fit (keyed joint).

Yet another feature of the invention resides broadly in the shock absorber, characterized by the fact that as a positive connection, the location hole 10 is provided with at least one area 27 projecting toward the valve cartridge 23, which interacts with a contact surface 29 in the vicinity of the valve cartridge 23.

Still yet another feature of the invention resides broadly in the shock absorber, characterized by the fact that the contact surface 29 runs at least partly over the circumference.

Yet still another feature of the invention resides broadly in the shock absorber, characterized by the fact that the contact surface 29 is a projecting surface and/or a groove 28 which runs at least partly over the circumference of the valve cartridge 23.

Another feature of the invention resides broadly in the shock absorber, characterized by the fact that the valve cartridge 23 is provided with axially flexible support in relation to the centering ring 9.

Still another feature of the invention resides broadly in the shock absorber, characterized by the act that the flexible support is an elastomer element 30 and/or a spring and/or a spring lock washer 31.

Still yet another feature of the invention resides broadly in the shock absorber, characterized by the fact that the slot(s) 32 of the centering ring 9 connect the space 13 to the holes 20.

Generally, examples of components, such as electromagnetic or solenoid valves, which may be utilized in accordance with the embodiments of the present invention may be found in U.S. Pat. No. 5,335,757, having Heinz Knecht and Hubert Beck as inventors, which issued on Aug. 9, 1994; and U.S. Pat. No. 4,749,069, which issued to Knecht et al. on Jun. 7, 1988.

Additionally, examples of such components may be found in the following publications: Federal Republic of Germany Laid open Patent Application No. 41 37 330, having Hubert Beck as inventor; end Federal Republic of Germany Patent Laid Open Patent Application No. 42 37 666, having Hubert Beck as inventor.

Methods of deep drawing, which may be utilized in accordance with the embodiments of the present invention, may be found in the following U.S. Patents: U.S. Pat. No. 4,532,793, which issued to Helmut on Aug. 6, 1985; U.S. Pat. No. 4,414,836, which issued to Saunders on Nov. 15, 1983; U.S. Pat. No. 4,290,293, which issued to Selines on Sep. 22, 1981; and U.S. Pat. No. 4,354,370, which issued to Ullman on Oct. 19, 1982.

All, or substantially all, of the components and methods of the various embodiments may be used with at least one embodiment or all of the embodiments, if any, described herein.

All of the U.S. patents, patent applications end publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:

a cylinder defining a chamber therein, said cylinder containing a damping fluid;

a piston rod sealingly projecting into said cylinder and being axially displaceable with respect to said cylinder;

a piston being attached to said piston rod, said piston being slidably disposed within said cylinder to sealingly divide said chamber into first and second chambers;

an outer tube disposed about said chamber, said piston and said piston rod;

means for permitting fluid communication between said first and second chambers;

said means for permitting fluid communication comprising damping valve means mounted at said outer tube;

said damping valve means comprising:

a valve arrangement, said valve arrangement having means for adjusting fluid communication between said first and second chambers;

means for mounting said valve arrangement with respect to said outer tube;

said mounting means comprising:

a first wall portion for fixedly holding at least a portion of said valve arrangement with respect to said outer tube;

a second wall portion being connected with said outer tube; and means for connecting said first wall portion and said second wall portion with one another, to fixedly retain said first wall portion with respect to said second wall portion;

said first wall portion and said second wall portion being spaced apart from one another; and said connecting means being positioned to provide at least one uninterrupted and hollow space between said first wall portion and said second wall portion;

said shock absorber having a longitudinal axis defined therethrough;

said valve arrangement having a longitudinal axis defined therethrough;

said second wall portion being spaced from said first wall portion by a substantial radial distance with respect to said longitudinal axis of said valve arrangement;

said first wall portion comprising:

an inner surface facing generally towards said second wall portion; and an outer surface facing generally away from said second wall portion;

said second wall portion comprising:

an inner surface facing generally towards said first wall portion; and an outer surface facing generally away from said first wall portion;

said inner surface of said first wall portion and said inner surface of said second wall portion being spaced apart from one another, to form said at least one uninterrupted and hollow space between said inner surface of said first wall portion and said inner surface of said second wall portion;

said first wall portion and said second wall portion are substantially concentric with respect to one another and to the longitudinal axis of said valve arrangement;

said second wall portion having a portion being snugly and sealingly interfaced with said outer tube of said shock absorber;

said outer tube defining an outer contour;

said portion of said second wall portion being interfaced with said outer tube comprising a flange portion; and said flange portion being configured to match the outer contour of said outer tube, to snugly and sealingly interface with said outer tube;

said flange portion of said second wall portion being welded to said outer tube;

said mounting means comprising a deep-drawn component;

said deep-drawn component comprising said first wall portion, said second wall portion and said connecting means;

said deep-drawn component, comprising said first wall portion, said second wall portion and said connecting means, being a single, integral component;

said flange portion of said second wall portion having been formed by stamping;

said outer tube being disposed external to, and coaxially with respect to, said cylinder;

said outer tube and said cylinder defining at least one major annular passage therebetween;

said at least one uninterrupted and hollow space between said first wall portion and said second wall portion comprising a minor passage; and said outer tube having means for connecting said minor passage with said at least one major annular passage.

2. The shock absorber according to claim 1, wherein:

said first wall portion has a first cylindrical wall portion and a second cylindrical wall portion;

said first cylindrical wall portion having means for fixedly holding said valve arrangement with respect to said outer tube; and said second cylindrical wall portion being connected to said first cylindrical wall portion and having a greater diameter than said first cylindrical wall portion.

3. The shock absorber according to claim 2, wherein:

said damping valve means further comprises means for sealing a portion of said second cylindrical wall portion with respect to said valve arrangement;

said minor passage is a first minor passage; and said sealing means, said valve arrangement and said second cylindrical wall portion define a second minor passage therewithin, said second minor passage being generally annular.

4. The shock absorber according to claim 3, further comprising:

a plurality of openings disposed through said second cylindrical wall portion; and said openings connecting said first minor passage with said second minor passage.

5. The shock absorber according to claim 4, wherein:

said valve arrangement comprises a valve cartridge;

said valve cartridge is generally elongate; and said sealing means comprises an annular seal disposed about said valve arrangement.

6. The shock absorber according to claim 5, wherein:

said first wall portion comprises thread means for fixedly holding said valve cartridge with respect to said outer tube;

said valve cartridge is cylindrical;

said first minor passage is annular;

said valve cartridge has a first end portion being disposed towards the longitudinal axis of said shock absorber and a second end portion disposed away from said first end portion;

said shock absorber comprises aperture means, disposed generally within said outer tube, for accommodating said first end portion of said valve cartridge;

said first wall portion is configured to center said valve cartridge with respect to said aperture means;

said shock absorber comprises internal tube means disposed between said cylinder and said outer tube and coaxially with respect to said cylinder and said outer tube;

said at least one major annular passage comprises a first major annular passage;

said first major annular passage is defined between said outer tube and said internal tube means;

said internal tube means and said cylinder define a second major annular passage therebetween;

the longitudinal axis of said damping valve means is generally perpendicular to the longitudinal axis of said shock absorber;

said internal tube means comprises a flange portion extending in a direction away from, and perpendicular to, the longitudinal axis of the shock absorber;

said flange portion of said internal tube means has a generally annular cross-section and defines said aperture means within said generally annular cross-section;

said valve cartridge is provided with an axially flexible support with respect to said mounting means;

said damping valve means further comprises magnetic coil means;

said flexible support comprises at least one of:

said sealing means, constituted by an elastomer element;

spring means connected to at least a portion of said valve cartridge; and a spring lock washer connected generally between said second end of said valve cartridge and a portion of said magnetic coil means.

7. The shock absorber according to claim 1, wherein:

said damping valve means further comprises means for sealing a portion of said first wall portion with respect to said valve arrangement;

said minor passage is a first minor passage; and said sealing means, said valve arrangement and said wall portion define a second minor passage therewithin, said second minor passage being generally annular.

8. The shock absorber according to claim 7, further comprising:

a plurality of openings disposed through said first wall portion; and said openings connecting said first minor passage with said second minor passage.

9. The shock absorber according to claim 8, wherein said first wall portion comprises form-lock means for fixedly holding said valve cartridge with respect to said outer tube.

10. The shock absorber according to claim 9, wherein:

said form-lock means comprises:

groove means disposed on said valve cartridge; and protrusion means disposed on said first wall portion, for interacting with said groove means to provide a form lock;

said valve arrangement comprises a valve cartridge;

said valve cartridge is generally elongate;

said sealing means comprises an annular seal disposed about said valve cartridge;

said valve cartridge is cylindrical;

said form-lock means comprises:

groove means disposed on said valve cartridge; and protrusion means disposed on said first wall portion, for interacting with said groove means to provide a form lock;

said openings in said first wall portion comprise a plurality of slots, said slots being elongate in a direction parallel to the longitudinal axis of said damping valve means;

said first minor passage is annular;

said valve cartridge has a first end portion being disposed towards the longitudinal axis of said shock absorber and a second end portion disposed away from said first end portion;

said shock absorber comprises aperture means, disposed generally within said outer tube, for accommodating said first end portion of said valve cartridge;

said first wall portion is configured to center said valve cartridge with respect to said aperture means;

said shock absorber comprises internal tube means disposed between said cylinder and said outer tube and coaxially with respect to said cylinder and said outer tube;

said at least one major annular passage comprises a first major annular passage;

said first major annular passage is defined between said outer tube and said internal tube means;

said internal tube means and said cylinder define a second major annular passage therebetween;

the longitudinal axis of said damping valve means is generally perpendicular to the longitudinal axis of said shock absorber;

said internal tube means comprises a flange portion extending in a direction away from, and perpendicular to, the longitudinal axis of the shock absorber;

said flange portion of said internal tube means has a generally annular cross-section and defines said aperture means within said generally annular cross-section;

said valve cartridge is provided with an axially flexible support with respect to said mounting means;

said damping valve means further comprises magnetic coil means;

said flexible support comprises at least one of:
  said sealing means, constituted by an elastomer element;
  spring means connected to at least a portion of said valve cartridge; and
  a spring lock washer connected generally between said second end of said valve cartridge and a portion of said magnetic coil means.

* * * * *

UNITED STATES PATENT AND TRADEMARK OFFICE
CERTIFICATE OF CORRECTION

Page 1 of 2

PATENT NO. : 5,603,392
DATED : February 18, 1997
INVENTOR(S) : Hubert BECK

It is certified that error appears in the above-indentified patent and that said Letters Patent is hereby corrected as shown below:

On the title page, item [56], under the U.S. PATENT DOCUMENTS section, after '3/1993', delete "Doursou" and insert --Dourson--.

On the title page, item [56], under the U.S. PATENT DOCUMENTS section, after '3/1995', delete "Haudke" and insert --Handke--.

In column 2, line 18, after 'process', delete "end" and insert --and--.

In column 4, line 20, after 'first', delete "end" and insert --and--.

In column 5, line 41, after 'valve', delete "S" and insert --8--.

In column 7, line 15, after 'plane', delete "and" and insert --end--.

UNITED STATES PATENT AND TRADEMARK OFFICE
CERTIFICATE OF CORRECTION

PATENT NO. : 5,603,392
DATED : February 18, 1997
INVENTOR(S) : Hubert BECK

It is certified that error appears in the above-indentified patent and that said Letters Patent is hereby corrected as shown below:

In column 7, line 65, after 'element', delete "103i al." and insert --103a.--.

In column 8, line 24, after 'preferably', delete "meal" and insert --metal--.

In column 9, line 41, before 'through', delete "rune" and insert --runs--.

In column 10, line 27, after '$104_1$', delete "end" and insert --and--.

In column 15, line 2, after 'inventor;', delete "end" and insert --and--.

Signed and Sealed this

Fifteenth Day of July, 1997

*Attest:*

BRUCE LEHMAN

*Attesting Officer*   Commissioner of Patents and Trademarks